US011944187B2

(12) United States Patent
Pesach et al.

(10) Patent No.: US 11,944,187 B2
(45) Date of Patent: *Apr. 2, 2024

(54) TRACKED TOOTHBRUSH AND TOOTHBRUSH TRACKING SYSTEM

(71) Applicant: Dentlytec G.P.L. LTD., Tel-Aviv (IL)

(72) Inventors: Benny Pesach, Rosh HaAyin (IL); Ygael Grad, Tel-Aviv (IL); Blanc Zach Lehr, Tel-Aviv (IL); Amitai Reuvenny, Kfar-Saba (IL); Lev Goldentouch, Rishon LeZion (IL)

(73) Assignee: DENTLYTEC G.P.L. LTD., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,539

(22) Filed: Nov. 18, 2022

(65) Prior Publication Data

US 2023/0099863 A1    Mar. 30, 2023

Related U.S. Application Data

(63) Continuation of application No. 16/766,647, filed as application No. PCT/IL2018/051286 on Nov. 26, 2018, now Pat. No. 11,533,986.

(60) Provisional application No. 62/590,613, filed on Nov. 26, 2017.

(51) Int. Cl.
| A46B 15/00 | (2006.01) |
| A61C 17/34 | (2006.01) |
| G06T 7/73 | (2017.01) |
| G06V 40/16 | (2022.01) |

(52) U.S. Cl.
CPC ......... *A46B 15/0002* (2013.01); *A61C 17/34* (2013.01); *G06T 7/74* (2017.01); *G06V 40/165* (2022.01); *G06T 2207/30201* (2013.01)

(58) Field of Classification Search
CPC ................. A46B 15/0002; G06T 7/74; G06T 2207/30201; G06V 40/165; A61C 17/34
See application file for complete search history.

(56) References Cited

U.S. PATENT DOCUMENTS

| 2,475,706 A | 7/1949 | Jamieson |
| 6,685,471 B1 | 2/2004 | Kawamura et al. |
| 7,415,788 B2 | 8/2008 | Little et al. |

(Continued)

FOREIGN PATENT DOCUMENTS

| CN | 103653731 A | 3/2014 |
| WO | WO 2016/178212 A1 | 11/2016 |
| WO | WO 2019/102480 A1 | 5/2019 |

OTHER PUBLICATIONS

Communication Pursuant to Article 94(3) EPC dated Jun. 9, 2022 From the European Patent Office Re. Application No. 18881533.6. (6 Pages).

(Continued)

*Primary Examiner* — Pinalben Patel
(74) *Attorney, Agent, or Firm* — COOLEY LLP

(57) ABSTRACT

A dental device tracking method including acquiring, using an imager of a dental device, at least a first image which includes an image of at least one user body portion outside of a user's oral cavity; identifying the at least one user body portion in the first image; and determining, using the at least the first image, a position of the dental device with respect to the at least one user body portion.

25 Claims, 12 Drawing Sheets

(56) References Cited

U.S. PATENT DOCUMENTS

| | | | |
|---|---|---|---|
| 8,159,352 | B2 | 4/2012 | Jiminez et al. |
| 8,550,299 | B2 | 10/2013 | Lohmann |
| 8,681,008 | B2 | 3/2014 | Jimenez et al. |
| 8,745,804 | B2 | 6/2014 | Jaksha |
| 8,938,838 | B2 | 1/2015 | Vashi |
| 9,254,185 | B2 | 2/2016 | Vila |
| 9,345,408 | B2 | 5/2016 | Curry et al. |
| 11,533,986 | B2 * | 12/2022 | Pesach .................. A61C 1/088 |
| 2009/0215015 | A1 | 8/2009 | Chu |
| 2010/0170052 | A1 | 7/2010 | Ortins et al. |
| 2011/0247156 | A1 | 10/2011 | Schmid et al. |
| 2012/0015316 | A1 | 1/2012 | Sachdeva et al. |
| 2013/0061412 | A1 | 3/2013 | Vashi |
| 2013/0085591 | A1 | 4/2013 | Ertl |
| 2014/0065588 | A1 | 3/2014 | Jacobson et al. |
| 2014/0146142 | A1 | 5/2014 | Duret et al. |
| 2015/0044629 | A1 | 2/2015 | Wang et al. |
| 2016/0037903 | A1 | 2/2016 | Lal |
| 2016/0143718 | A1 | 5/2016 | Seral et al. |
| 2016/0262686 | A1 | 9/2016 | Tsuji et al. |
| 2017/0007377 | A1 | 1/2017 | Pesach et al. |
| 2017/0069083 | A1 | 3/2017 | Vetter et al. |
| 2017/0100219 | A1 | 4/2017 | Schmitt |
| 2017/0188836 | A1 | 7/2017 | Xi et al. |
| 2017/0238692 | A1 | 8/2017 | Sarubbo et al. |
| 2020/0214538 | A1 | 7/2020 | Peasch et al. |
| 2020/0359777 | A1 | 11/2020 | Pesach et al. |
| 2022/0175491 | A1 | 6/2022 | Ben-Hamadou et al. |

OTHER PUBLICATIONS

International Preliminary Report on Patentability dated Jun. 4, 2020 From the International Bureau of WIPO Re. Application No. PCT/IL2018/051286. (11 Pages).

International Search Report and the Written Opinion dated Mar. 1, 2019 From the International Searching Authority Re. Application No. PCT/IL2018/051286. (17 Pages).

Notice of Allowance dated Aug. 17, 2022 together with Interview Summary dated Aug. 8, 2022 from U.S. Appl. No. 16/766,647. (13 pages).

Official Action dated Mar. 25, 2022 from U.S. Appl. No. 16/766,647. (42 pages).

Supplementary European Search Report and the European Search Opinion dated Jul. 14, 2021 From the European Patent Office Re. Application No. 18881533.6. (8 Pages).

Wei et al. "3D Face Recognition Using Face Feature Points Based on Parallel Stereo Vision", International Journal of Digital Content Technology and Its Applications, 4(1): 86-95, Feb. 2010.

* cited by examiner

TRACKED TOOTHBRUSH AND TOOTHBRUSH TRACKING SYSTEM

RELATED APPLICATIONS

This application is a continuation of U.S. patent application Ser. No. 16/766,647 filed on May 22, 2020, which is a National Phase 35 U.S.C. § 371 of PCT Patent Application No. PCT/IL2018/051286, having International Filing Date of Nov. 26, 2018, which claims the benefit of priority under 35 USC § 119(e) of U.S. Provisional patent Application No. 62/590,613 filed Nov. 26, 2017. The contents of the above applications are all incorporated by reference as if fully set forth herein in their entirety.

FIELD AND BACKGROUND OF THE INVENTION

The present invention, in some embodiments thereof, relates to a tracked toothbrush and toothbrush tracking system and, more particularly, but not exclusively, to a tracked toothbrush including an imager.

Background art includes U.S. Pat. No. 8,744,192, U.S. patent Application Publication No. US2011/247156, U.S. Patent Application Publication No. US2016/0037903 and U.S. Patent Application Publication No. US2017/238692 the contents of which are incorporated herein by reference in their entireties.

SUMMARY OF THE INVENTION

Following are examples of some embodiments of the invention. Features of one example may be combined with features of one or more other examples, unless expressly prohibited and form additional examples of some embodiments of the invention.

Example 1. A dental device tracking method comprising:
acquiring, using an imager of a dental device, at least a first image which includes an image of at least one user body portion outside of a user's oral cavity;
identifying said at least one user body portion in said first image; and
determining, using said at least said first image, a position of said dental device with respect to said at least one user body portion.

Example 2. The method according to Example 1, wherein said determining also includes determining a position of a portion of said dental device inside said user's oral cavity with respect to said identified at least one user body portion.

Example 3. The method according to Examples 1 or 2, wherein said determining also includes determining a position of a/said portion of said dental device inside said user's oral cavity with respect to a dental feature using an anatomical model.

Example 4. The method according to Example 3, wherein said anatomical model includes said dental feature and said at least one user body portion.

Example 5. The method according to Example 2, wherein said dental device comprises a toothbrush.

Example 6. The method according to Example 5, wherein said acquiring occurs during brushing with said toothbrush.

Example 7. The method according to Example 4, wherein said at least one user body portion comprises a facial landmark.

Example 8. The method according to Example 1, wherein at least said first image also includes an image of at least a portion of said user's face.

Example 9. The method according to Example 1, wherein at least said first image also includes a reflected image.

Example 10. The method according to Example 9, wherein said reflection includes at least a portion of said user's body.

Example 11. The method according to Example 9, wherein said reflection includes at least a portion of said dental device.

Example 12. The method according to Example 3, further comprising receiving said anatomical model.

Example 13. The method according to Example 3, further comprising:
acquiring, using the imager, at least one second image which includes an image of at least one dental feature corresponding to the user's face; and
generating said anatomical model using at least said first and second dental images.

Example 14. The method according to Example 1, further comprising:
determining a position of at least one lower face landmark; and
estimating, using said determined position, a mandibular angle.

Example 15. The method according to Example 1, further comprising performing said acquiring, said identifying and said determining, a plurality of times so as to determine a plurality of determined dental device positions.

Example 16. The method according to Example 15, wherein said dental device comprises a toothbrush and said performing occurs during brushing with said toothbrush.

Example 17. The method according to Example 16, further comprising evaluating brushing performance using said plurality of determined dental device positions.

Example 18. The method according to Example 17, further comprising displaying feedback to at least one of said user and a dental practitioner, based on said evaluating.

Example 19. The method according to Example 17, further comprising displaying feedback to a dental practitioner, based on said evaluating.

Example 20. The method according to Example 17, wherein said evaluating comprises evaluating brushing duration for one or more dental feature.

Example 21. The method according to Example 20, wherein said dental feature comprises a tooth or at least a portion of a tooth.

Example 22. The method according to Example 17, wherein said evaluating comprises identifying brushed dental features.

Example 23. The method according to Example 1, further comprising sensing contact between said dental device and one or more dental features.

Example 24. The method according to Example 2, further comprising controlling one or more actuators based on said determined position of at least a portion of said dental device within a user's oral cavity.

Example 25. The method according to Example 3, comprising:
acquiring:
at least one dental image of a plurality of user dental features using an intra oral scanner (IOS) imager;
at least one body image of one or more user body portions outside the oral cavity using at least one additional imager of said IOS;
identifying a position of said one or more user body portions with respect to said IOS, using said at least one image;

generating a tooth model of at least one tooth using said at least one dental image; and generating said anatomical model using at least said tooth model and at least said position of said one or more user body portions.

Example 26. The method according to Example 25, wherein said at least one additional imager is located on a handle of said IOS.

Example 27. A hand-held dental tracking device comprising a handle sized and shaped to be comfortably grasped by a human user's hand, the handle comprising:

an anchor configured to attach a dental implement head to said handle;
and
at least one imager with a field of view (FOV) sized and shaped such that when at least a portion of said dental implement head is within said user's mouth, to include one or both of:
at least a portion of said user's body outside the oral cavity; and
a reflection of at least a portion said user's body outside the oral cavity.

Example 28. The device according to Example 27, wherein said at least a portion of said user's body outside the oral cavity comprises at least a portion of said user's face.

Example 29. The device according to Example 27, wherein said dental implement head is sized and shaped for insertion into a human user's oral cavity.

Example 30. The device according to Example 27, wherein said dental implement comprises a toothbrush.

Example 31. The device according to Example 27, further comprising a projector configured to project light onto at least a portion of said FOV.

Example 32. The device according to Example 31, wherein said projector projects non-visible light and said imager is configured to detect said non-visible light.

Example 33. The device according to Example 32, wherein said non-visible light comprises infrared light.

Example 34. The device according to Example 27, further comprising an additional imager with a FOV configured to collect images inside said oral cavity when a portion of said dental implement device is within said oral cavity.

Example 35. The device according to Example 34, further comprising a projector configured to illuminate said additional imager FOV with visible light.

Example 36. The device according to Example 27, wherein said at least one imager comprises:
a first imager with a FOV configured to image at least a portion of said user's body outside the oral cavity; and
a second imager with a FOV configured to image a reflection of at least a portion said user's body outside the oral cavity.

Example 37. The device according to Example 27, further comprising at least one contact sensor configured to detect contact between said head a tooth.

Example 38. The device according to Example 27, wherein said anchor is configured to attach a calibration head to said dental device.

Example 39. An adaptor for tracking a dental implement comprising:
a body;
a connector connected to said body and configured to attach said adaptor to said dental implement; and
at least one imager with a field of view sized and shaped, when the adaptor is attached to said dental implement and a head of said dental implement is within a human user's mouth, to include one or both of:
at least a portion of said user's face; and
at least a portion of a reflection of said user's face.

Example 40. A glasses for toothbrush tracking comprising:
at least one imager configured to collect images of at least a portion of a toothbrush, during brushing of the teeth with said toothbrush;
a processor configured:
to receive at least one image from said at least one imager;
to identify a position of said toothbrush with respect to said glasses, using said at least one image.

Example 41. The system according to Example 40, wherein said processor is configured to identify a position of a portion of said toothbrush within a user's oral cavity.

Example 42. The system according to Example 41, wherein said processor is configured to generate feedback regarding brushing, based on said position of said toothbrush.

Example 43. The system according to Example 42, wherein said glasses include a user interface configured to display said feedback.

Example 44. The system according to Example 40, wherein said processor is configured to identify one or more marker on said toothbrush, using said at least one image.

Example 45. The system according to Example 41, wherein said processer is configured to identify a position of a portion of said toothbrush within a user's oral cavity, with respect to one or more dental feature, using an anatomical model.

Example 46. The device according to Example 43, wherein said feedback is displayed as a game.

Example 47. The device according to Example 46, wherein said feedback is displayed on a 3D model.

Example 48. The device according to Example 47, wherein said 3D model is said anatomical model.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as collecting dental measurements, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DESCRIPTION OF SPECIFIC EMBODIMENTS OF THE INVENTION

Figure 1A:
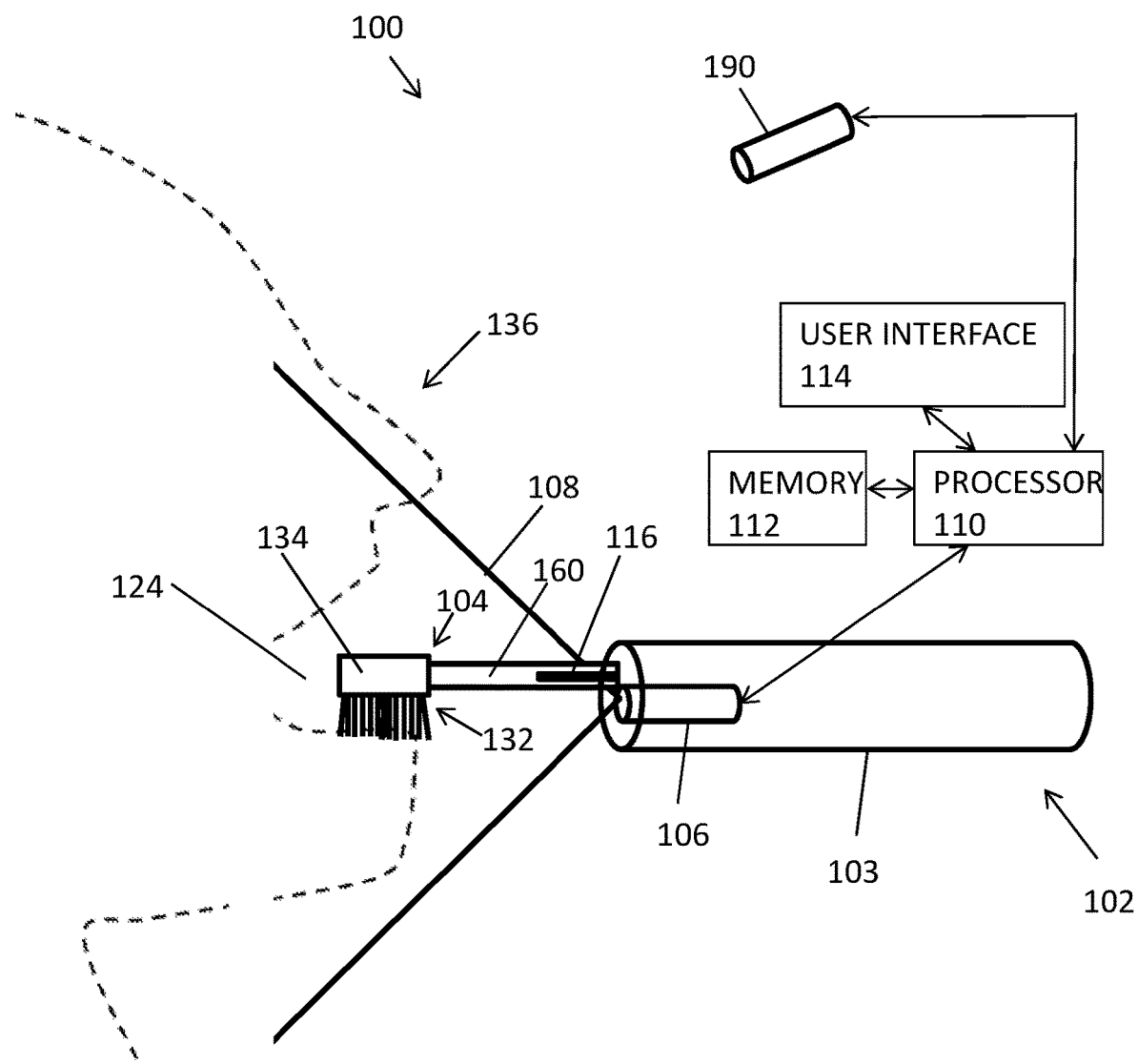
FIGS. 1A-1B are simplified schematics of a toothbrush tracking system, according to some embodiments of the invention.

The present invention, in some embodiments thereof, relates to a tracked toothbrush and toothbrush tracking system and, more particularly, but not exclusively, to a tracked toothbrush including an imager.

Overview

A broad aspect of some embodiments of the invention relates to tracking, e.g. 3D tracking, of position of a dental implement and/or device, (e.g. a toothbrush) within a user's mouth, using images of user body portion/s outside user's oral cavity. In some embodiments, one or more image is collected by one or more dental implement imager.

Alternatively or additionally, in some embodiments, images of the user body portion/s outside the oral cavity are collected by imager/s external to the dental implement.

In some embodiments, the dental implement includes one or more imager configured to collect images of inside the oral cavity.

Potentially, tracking of toothbrush position using images of user body portion/s outside of the mouth enables optical tracking of the toothbrush (in some embodiments, with respect to dental feature/s) when portions of the toothbrush and/or mouth are obscured. For example, by the toothbrush, by fluid (e.g. toothpaste, saliva) and/or user tissue e.g. cheeks, closing of the user's mouth around the toothbrush.

In some embodiments, the toothbrush includes at least one imager configured to collect images including at least a portion of a user's body, outside the user's oral cavity. Where, in some embodiments, the imager is located on the toothbrush and/or has a field of view (FOV) suitable for collection of images of portion/s of the user's body e.g. when the toothbrush is in use e.g. when a head of the toothbrush is within the oral cavity. In some embodiments, the toothbrush includes one or more imager configured to collect images of a user's face.

In some embodiments, one or more imager is configured to collect images of a reflection of the user. For example, where the imager is disposed on a distal end of the dental implement (where the proximal end of the implement is inserted into the user's mouth).

In some embodiments, the dental implement (e.g. toothbrush) includes a plurality of imagers, a potential benefit being (e.g. when imagers are located on a toothbrush handle) the ability to image user body portions when portion/s of the handle are obscured by a user's hand and/or when an orientation of the toothbrush changes during brushing. For example, in some orientations of the toothbrush during brushing one or more imager may collect images lacking user body portion/s and/or may collect images where user body portion/s have few identifiable landmarks. For example, when an imager is oriented in an inferior direction, in some embodiments, images include fewer identifiable landmarks e.g. chin, jaw line as compared to when the imager is orientated in a superior direction where, in some embodiments images include eye/s and/or nose and/or nostrils.

In some embodiments, user body portion/s are identified from captured images and a spatial relationship between the user body portion/s and the dental implement is determined using the image/s and optionally, an anatomical model.

In some embodiments, only relative position and/or movement of the dental device is determined from image/s. Where, in some embodiments, the determined position is relative to one or more identified user body portion and, in some embodiments, the position and/or movement of the dental device is not determined with respect to dental features. In some embodiments, calibration measurements and/or an anatomical model are used to determine, from the images, the position of the dental device with respect to dental feature/s.

In some embodiments, a spatial relationship between landmarks (e.g. of user body portion/s) and the dental implement imager are determined from collected images. In some embodiments, position of other portion/s of the dental device (e.g. dental implement head within the user's mouth) are then inferred using known dimensions of the dental implement. In some embodiments, one or more image includes the dental implement and the spatial relationship is determined using an identified position of the dental implement and of the user body portion/s. In some embodiments, the dental implement includes one or more marking and/or landmark which is identified in image/s.

In some embodiments, movement of the dental implement is tracked using determined positions of the dental implement with respect to identified landmarks (e.g. of user body portion/s). For example, in some embodiments, a landmark is identified in a series of images collected over time where, in some embodiments, a position of the dental implement is estimated for each image, providing movement with time of the dental device. In some embodiments, the landmark is a user body portion and/or a reflection of a user body portion. Alternatively or additionally, in some embodiments, the landmark is an object within a system FOV. For example, a marker within an FOV of an imager collecting the images e.g. a marker affixed to a wall of the room in which a user brushes teeth. In some embodiments, multiple landmarks are identified in image/s.

In some embodiments, the images are collected by a dental implement imager and, in some embodiments, the position (and then, in some embodiments, e.g. using multiple images, movement) of the dental implement is determined a spatial relationship between the imager and the landmark/s.

In some embodiments, tracked movement of the dental implement (e.g. using image/s and/or other tracking data e.g. position sensor e.g. accelerometer) is assessed. For example, to provide feedback.

For example, where positions (optionally correlated with other data e.g. sensor data, e.g. contact and/or pressure data) of the dental implement are compared to expected positions for adequate brushing e.g. to provide feedback.

For example, to assess whether basic brushing movements were performed and/or if particular attention was devoted to an indicated area and/or if a user is neglecting one or more area (e.g. due to discomfort).

In some embodiments, an identified position (e.g. of a body portion, a landmark, a dental device) is in 3D space, with respect to a position of another object (e.g. of a body portion, a landmark, a dental device). In some embodiments, "position" and/or a "spatial relationship" is a vector describing the relative positions of two portions. In some embodiments, a position is a two dimensional distance between two portions.

In some embodiments, an angle of a user body portion and/or of the dental device is determined from image/s using known distances and/or ratios (e.g. from an anatomic model and/or from known dimensions of the dental device).

In some embodiments, user body portion/s are directly imaged by the imager/s. Alternatively, or additionally, in some embodiments, a reflection of body portion/s is imaged. For example, in some embodiments, a user brushes user teeth standing in front of a mirror and a toothbrush imager captures images of the user's reflection within the mirror, potentially overcoming issues of obscuring of line of sight of user body portion/s and/or of the dental device.

In some embodiments, the anatomical model (e.g. anatomical calibration model) is specific to a user, for example, in some embodiments, a user specific anatomical model is generated using optical measurements with the toothbrush. In some embodiments, the toothbrush head is removed and measurements for the anatomical model are collected using a calibration head. In some embodiments, the calibration head includes one or more mirror, potentially enabling (e.g. by changing the FOV of the imager) collection of optical measurements e.g. using toothbrush imager/s configured for (e.g. with FOV suitable for) collection of user body portion images.

In some embodiments, the anatomical model is generated using an intra oral scanner (IOS). In some embodiments, the IOS is scanned over dental features and generates a tooth model. In some embodiments, for example, during scanning the tooth model is extended to include body portions outside the oral cavity, e.g. using images of the body portion/s collected by one or more additional imager. In some embodiments, one or more of the additional imager/s are coupled to the IOS. In some embodiments an external camera collects images of the body portion/s.

In some embodiments, images collected of inside the oral cavity are used with images collected outside the oral cavity in tracking of the dental implement. For example, in some embodiments, user body portion/s (e.g. facial feature/s) identified in images are used to determine movement of and/or estimate position of the dental implement. For example, images collected from within the oral cavity are used to increase accuracy (e.g. to less than 5 mm, or less than 2 mm, or less than 1 mm, or less than 0.5 mm, or less than 0.1 mm accuracy) of tracking e.g. with respect to dental object/s e.g. teeth, for example, enabling estimation of position on and/or orientation of the dental implement with respect to a tooth.

In some embodiments, facial features are identified in acquired images using facial recognition technology/ies of the art, for example landmark identification. In some embodiments, facial features are identified in acquired images using one or more feature as disclosed in "3D Face Recognition Using Face Feature Points Based on Parallel Stereo Vision", from the International Journal of Digital Content Technology and its Applications 4(1):86-95, February 2010 which is herein incorporated by reference in its entirety.

In some embodiments, artificial intelligence is used to identify facial features in acquired images. In some embodiments, stereo imaging and/or a RGB image, a neural network is trained to extract predefined 3D features. In some embodiments, a classical machine learning algorithm, e.g. Haar cascade, is used to extract features. In some embodiments, a classical machine learning algorithm is trained to train and/or enhance the neural networks. In some embodiments, additional color spaces such as YCBCR and LAB are used to enhance detection quality. In some embodiments, generative adversarial networks are used to improve detection robustness e.g. to one or more of noise, environmental factors, and deformations. In some embodiments, facial feature detection is optimized to an individual using face recognition and/or good features to track algorithm. In some embodiments, certain features are selected from a range of available features, based on the ability to recognize the individual and/or track the facial movements.

In some embodiments, the system includes electromagnetic and/or ultrasonic position tracking e.g. of the toothbrush. Where, in some embodiments, position sensor data is used in addition to optical data for tracking position of the toothbrush.

In some embodiments, tooth tracking data (and/or toothbrush tracking data) is used to evaluate brushing performance. In some embodiments, collected position data with respect to user dental features (e.g. teeth), for example, duration and/or direction and/or pressure of brushing is evaluated (e.g. by a processor). In some embodiments, feedback regarding brushing performance is provided, for example, is displayed to and/or may be accessed by the user (and/or other individual/s e.g. parent, care-giver) during brushing. For example, in some embodiments, a user is guided by feedback to brush portion/s of the user's teeth e.g. instructions to the user to brush to the furthest back molar/s of one or both jaws.

In some embodiments, display is on a system user interface (e.g. as described elsewhere within this document) and/or the system (e.g. a system processor) sends display information to an external device for display for example, a portable electronic device e.g. cellphone, a TV, a computer monitor.

Alternatively or additionally, in some embodiments, feedback is provided to the user (and/or other individual e.g. parent, care-giver, dental healthcare practitioner) after brushing to guide and/or improve potential performance. Where feedback includes, for example, which areas have not been brushed and/or have not been brushed for a sufficient time and/or duration and/or at a correct pressure.

In some embodiments, tooth tracking data (and/or toothbrush tracking data) is used to a provide status update and/or alert regarding brushing performance and/or oral health to the user and/or to another individual e.g. parent, care-giver, dental healthcare practitioner.

In some embodiments, tooth tracking data is used to control functionality of the toothbrush. For example, in some embodiments, one or more actuator is controlled based on tracked position of the toothbrush within the mouth e.g. brushing direction and/or speed being tailored for different mouth portions, optionally where functionality is tailored to an individual user. Where, for example, a dental practitioner enters and/or selects functionality e.g. for different mouth portion/s into the system.

In some embodiments, a dental implement tracking system includes one or more wearable element. For example, glasses to be worn by a user e.g. during tracking of the dental implement. In some embodiments, the wearable element e.g. glasses include one or more user interface, e.g. for display of information (e.g. brushing feedback) to a user. Alternatively or additionally, in some embodiments, the glasses include one or more imager. Where imager/s are configured to capture images of the user and/or dental implement (e.g. directly and/or a reflection image in a mirror). Where, in some embodiments, the images are used to track a position of the dental implement within the user's mouth (e.g. including one or more feature as described above and/or elsewhere in this application).

An aspect of some embodiments of the invention relates to using data collected by the system to assess and/or track one or more user parameter.

In some embodiments, collected data, for example, toothbrush tracking data and/or images collected from within the oral cavity is used in assessment of one or more user parameter.

In some embodiments, collected data includes optical data (e.g. images) collected of user teeth under illumination by structured light. For example, including one or more feature as described and/or illustrated in U.S. Provisional patent Application No. 62/662,558 filed 25 Apr. 2018.

Where assessment, in some embodiments is where a single data set (e.g. from a single brushing session) is used, e.g. processed e.g. to provide feedback. Where tracking, in some embodiments, is where more than one data set, e.g. from multiple brushing sessions e.g. over a plurality of days and/or weeks and/or moths is used, e.g. processed, e.g. to provide feedback.

In some embodiments, assessment and/or tracking is of a dental treatment. For example, of tooth whitening. Where, in some embodiments, images from inside the oral cavity are used to assess the effectiveness of a whitening treatment and/or longevity of a whitening treatment. Where, in some embodiments, images from inside the oral cavity and tracking data are used together to provide assessment and/or tracking for different regions of the user's mouth.

In some embodiments, tracking and/or assessment is of movement (migration) or lack thereof of teeth within a user's mouth. Where, for example, a measured spatial relationship between teeth (and/or other dental objects e.g. prosthetics) and/or user body portion/s outside the body are used to assess and/or track migration of the user's teeth within the user's mouth.

In some embodiments, tooth brushing is used as a daily data measurement for user health indicator/s. In some embodiments, user health indicator/s are tracked using data collected from multiple brushing sessions, for example, in some embodiments, the data is analyzed to provide information regarding change in time in the health indicator. Alternatively or additionally, in some embodiments, assessment of one or more user health indicator uses data collected in a single day and/or brushing session.

In some embodiments, images are collected of region/s not generally observed by a user, for example, underneath the tongue, e.g. of the throat and/or tonsils e.g. to assess and/or track health indicator/s of these region/s.

In some embodiments, a health indicator is an extent of gum bleeding e.g. providing an indication as to gum and/or dental health and/or general health. In some embodiments, bleeding is assessed using images collected from within the oral cavity, for example. For example, in some embodiments, bleeding is measured using quantity and/or intensity of red tones in collected images. In some embodiments, bleeding is measured with respect to applied pressure e.g. as measured using apparatus and/or techniques described within this document (e.g. using one or more pressure sensor). In some embodiments, bleeding is assessed and/or tracked for different portions of the user's mouth.

In some embodiments, a health indicator is an extent of one or more of dental decay, plaque, staining on the user's teeth e.g. affected areas and/or extent (e.g. depth of plaque layer, extent of decay).

In some embodiments, a user applies a plaque disclosing agent to the user's mouth and then images are collected from within the oral cavity e.g. during and/or before and/or after brushing.

In some embodiments, color of user mouth portion/s e.g. gums, tongue, soft oral cavity tissue, teeth are a health indicator. For example, color indicators (e.g. in oral mucosa) and/or changes due to one or more of bleeding, ulcers, abnormally white tissue (leukoplakia), blisters.

In some embodiments, color and/or extent of a color and/or are identified. In some embodiments, color changes are detected and assessed to identify and/or provide an alert to a caregiver regarding likelihood of leukemia, HIV, nicotine stomatitis, cancerous or pre-cancerous changes.

In some embodiments, 3D deformations of the oral cavity (e.g. of soft tissue) e.g. as measured using stereo imaging and/or structured light depth measurements are a health indicator. For example, where exemplary identified deformations include swelling (e.g. of oral mucosa e.g. of tonsils and/or throat), gum withdrawal, abnormal growth/s (e.g. as an indicator of tumor/s).

In some embodiments, blister/s are identified (e.g. from color and/or 3D deformation information) and/or size and/or shape of blisters are tracked. For example, to identify and/or monitor one or more of skin diseases, pemphigus vulgaris, mucous membrane pemphigoid, herpetic diseases or other viral diseases e.g. herpetic gingivostomatitis.

In some embodiments, measurements are used in medical follow up, comprising tracking persistence and/or growth of abnormality/ies. In some embodiments, measurements and/or evaluated measurements are transferred to a dental and/or medical practitioner for examination.

In some embodiments, health indicator measurements are collected separately to brushing. For example, where image/s are collected using the dental device when the device lacks a toothbrush head and/or when the head is contacted to gums e.g. to measure gum health e.g. before and/or after brushing. For example, where toothpaste does not obstruct collected images.

In some embodiments, assessment and/or tracking is of condition of user mouth portion/s. Where, in some embodiments, measurement of optical properties of the mouth portion/s e.g. under different types of light exposure (e.g. structured light) are used to assess and/or track one or more of decay, plaque, stains, gum condition. For example, including one or more feature as described and/or illustrated in U.S. Provisional patent Application No. 62/662,558 filed 25 Apr. 2018.

Potentially, as a toothbrush in general is used often (e.g. daily) trends in brushing and/or user health are detected using changes over time, even without accurate positioning data and/or color and/or calibration.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

EXEMPLARY EMBODIMENTS

Figure 1B:
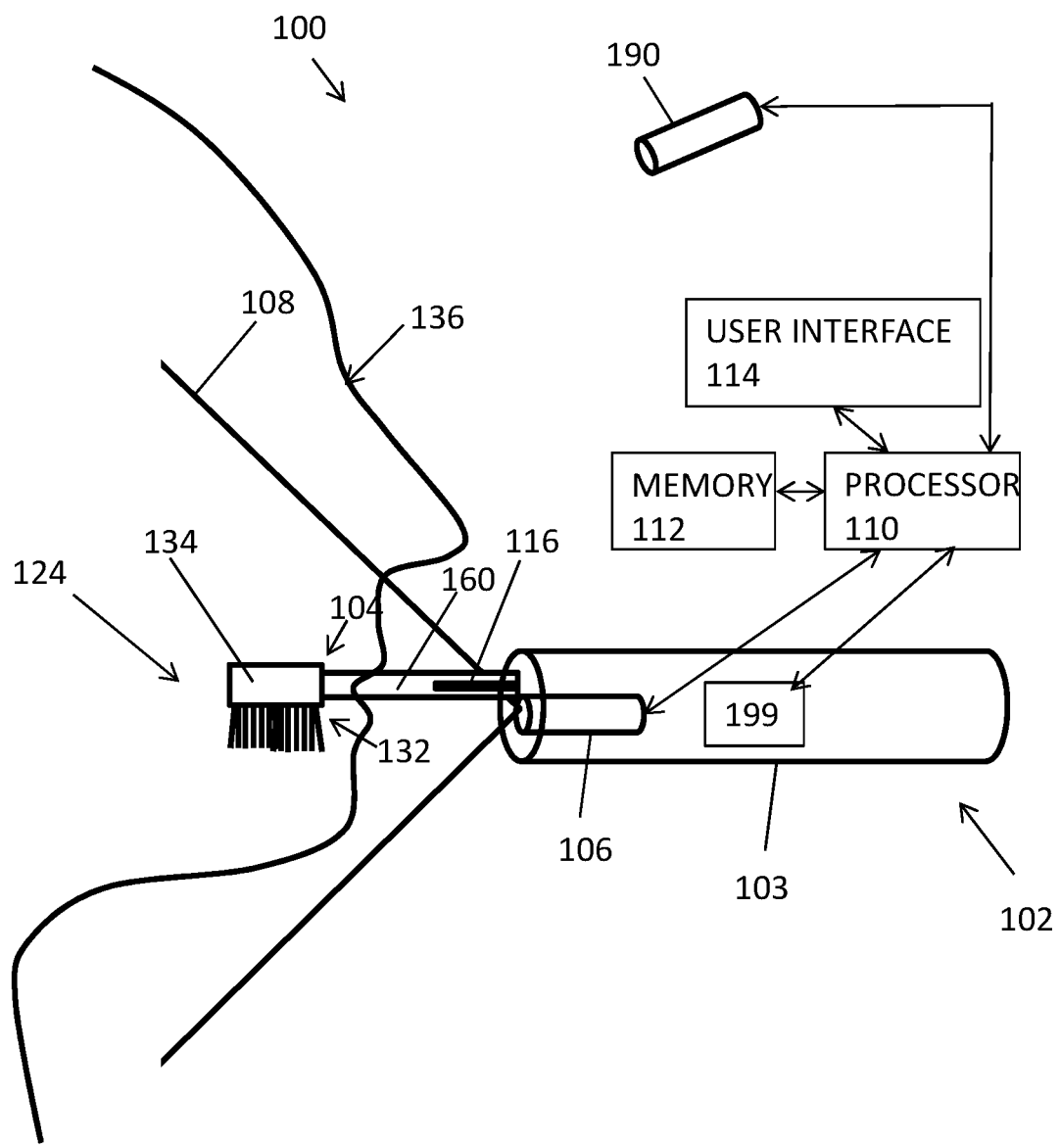

FIGS. 1A-1B are simplified schematics of a toothbrush tracking system 100, according to some embodiments of the invention.

In some embodiments, system 100, includes a dental device 102. In some embodiments, dental device 102 includes and/or is configured to be attached to a toothbrush head 104. In some embodiments, a body 103 of dental device 102 includes one or more anchor configured to connect with an anchor disposed on toothbrush head 104. In some embodiments, anchors include indentation/s and/or protrusion/s configured to (e.g. sized and/or shaped to) connect with each other. In some embodiments, anchors include indentation/s and/or protrusion/s configured to connect with a connector. In some embodiments, toothbrush head 104 connects to body 103 by one or more of snap connection, screw connection. In some embodiments, toothbrush head 104, is connected to a body 103 of the dental device 102, for example, by one or more connector 116, where, in some embodiments, connector 116 includes a protrusion which is sized and/or shaped to fit into an indentation within toothbrush head 104.

Optionally, in some embodiments, dental device 102 includes one or more actuator (not illustrated in FIGS. 1A-1B) configured to move and/or vibrate at least a part of toothbrush head 104 e.g. to clean dental surfaces in contact with the toothbrush. In some embodiments, actuator/s move at least a portion of toothbrush bristles 132 e.g. with respect to a base 134 of toothbrush head 104.

In some embodiments, one or more actuator is configured to move one or more imager and/or mirror of a dental device. For example, in some embodiments, a processor receiving tracking data, generates, based on the data, control signals to send to actuator/s instructing movement of imager/s (and/or mirror/s e.g. mirror 852 FIGS. 8A-8B) of the dental device. For example, to maintain user body portion/s within an imager FOV.

In some embodiments, one or more actuator is configured to move one or more imager to capture image/s of a volume around the imager and/or dental device. For example, of a volume of an oral cavity e.g. during calibration and/or collection of measurements for generation of an anatomical model. For example, to capture particular facial features and/or all facial features.

In some embodiments, the dental device includes one or more mirror which, in some embodiments, directs and/or splits an FOV of one or more imager. In some embodiments, mirror/s are configured to be moved by one or more actuator, e.g. to change FOV of the imager/s.

In some embodiments, device body 103 includes a handle (e.g. is a handle) sized and/or shaped to be comfortably grasped in a user's hand e.g. in a palmar grasp. For example, in some embodiments, body 103 is elongate. In some embodiments, a length (e.g. central long axis length) of device body 103 is 5-30 cm or 10-20 cm or higher or lower long or intermediate lengths or ranges. In some embodiments, an average and/or maximum width (where width is, in some embodiments, measured perpendicular to the central long axis of the body) and/or diameter of device body 103 is 0.5-10 cm or 1-5 cm or higher or lower long or intermediate widths or ranges.

In some embodiments, dental device 102 includes at least one imager 106 with a field of view (FOV) 108. In some embodiments, imager 106 is configured such that (e.g. imager is positioned on device 102) so that FOV 108 extends away from a center of device 102.

In some embodiments, at least a portion of toothbrush 102, (e.g. at least a portion of toothbrush head 104) is within FOV 108.

In some embodiments, imager 106 is configured such that at least one user body part, outside the oral cavity is within the FOV. For example, for at least a portion of possible toothbrush head 104 positions within oral cavity 124 e.g. during brushing.

In some embodiments, at least a portion of the user's face 136 is within the FOV. For example, at least a portion of the user's head, at least one facial feature or a portion of at least one facial feature (e.g. facial topography, nose, nostril, eye, ear, chin, jaw line, facial marking/s e.g. birthmark, tattoo, freckle, mole, scar) is within the FOV. FIG. 1A illustrates system 100 when the user's mouth is open, for example, where at least a portion of the toothbrush head and/or user dental feature/s are within FOV 108 and when portion/s of the user/s face are within the FOV.

Where, for example, in some embodiments, imager is configured by positioning on device 102 and/or sizing and/or shaping of the FOV. In some embodiments, imager FOV 108 doesn't include portion/s of the oral cavity (e.g. when the imager is disposed on a distal portion of the dental device 102, e.g. as described and/or illustrated regarding imagers 418, 422 FIGS. 4-5).

In some embodiments, imager FOV 108 doesn't includes portion/s of the oral cavity when the portion/s are obscured. For example, in some embodiments, user/s oral cavity and/or the toothbrush head is obscured from view of imager/s. For example, as illustrated in FIG. 1B where user's 128 mouth is closed over the toothbrush head, imager 106, then collecting images of portion/s of the user's body (e.g. face) outside the user's oral cavity. For example, when the user's mouth is closed.

In some embodiments, imager 106 includes a visible wavelength optical imager. Alternatively or additionally, in some embodiments, imager 106 includes an infrared imager. In some embodiments, device 102 includes one or more light projector, for example to illuminate portion/s of the user for image collection. In some embodiments, a light projector projects patterned light e.g. as described regarding projectors 542, 546, FIG. 5.

In some embodiments, imager 106 includes one or more heating element, for example, to prevent and/or reduce condensation.

In some embodiments, imager 106 is connected (e.g. by one or more wire and/or wirelessly) to one or more processor 110. Where, in some embodiments, imager 106 sends collected image data and/or receives control instruction/s from processor 110. In some embodiments, processor is connected to a memory 112. In some embodiments, processor is connected to one or more user interface 114, where, in some embodiments, processor sends data for communication (e.g. display) to a user by user interface 114 and/or receives user input signal/s from user interface 114.

In some embodiments, one or more of processor 110, memory 112 and user interface 114 are housed within device 102 e.g. within device body 103. Alternatively, or additionally (additionally where the system includes more than one processor and/or memory and/or user interface) one or more of processor 110, memory 112 and user interface 114 are external to device 102. For example, in some embodiments, an external user interface e.g. a display, displays information to the user e.g. including one or more feature as described and/or illustrated regarding display 414 FIG. 4.

In some embodiments, the system includes an external user interface and/or a display is a mobile phone and/or a tablet. In some embodiments, processor 110 and or memory 112 are located remotely in the "cloud".

In some embodiments, dental device 102 includes one or more power source which provides power to one or more of toothbrush actuator/s, imager 106, memory 112, user interface 114, processor 110.

Optionally, in some embodiments, system 100 includes one or more imager 190 which is external to the dental device. For example, where imager 190 is configured to collect images of the user and/or dental device e.g. locating the dental device and/or user e.g. the dental device with respect to one or more portion of the user, for example, according to one or more feature described and/or illustrated by art cited in the background section of this document.

In some embodiments, external imager 190 is mounted to a wall and/or mirror. In some embodiments, the external imager has a data connection to one or more of user interface 114, memory 112, processor 110 e.g. sending data to and/or receiving commands from processor 110. In some embodiments, a position of the dental device is tracked using images collected by external imager e.g. with respect to one or more user body portion (e.g. facial feature). In some embodiments, position of one or more user body portion is tracked in images collected using the external camera e.g. facial feature/s. In some embodiments, the dental device is not tracked, a position of the dental device not being determined and/or extracted from one or more (e.g. all) collected image/s.

In some embodiments, system 100 includes one or more sensor 199. In some embodiments, sensor 199 is part of dental device 102. In some embodiments, sensor 199 sends data to and/or receives control instructions from processor 110.

In some embodiments, sensor 199 includes one or more position sensor and/or one or more contact and/or pressure sensor (e.g. as described elsewhere in this document).

Figure 2:
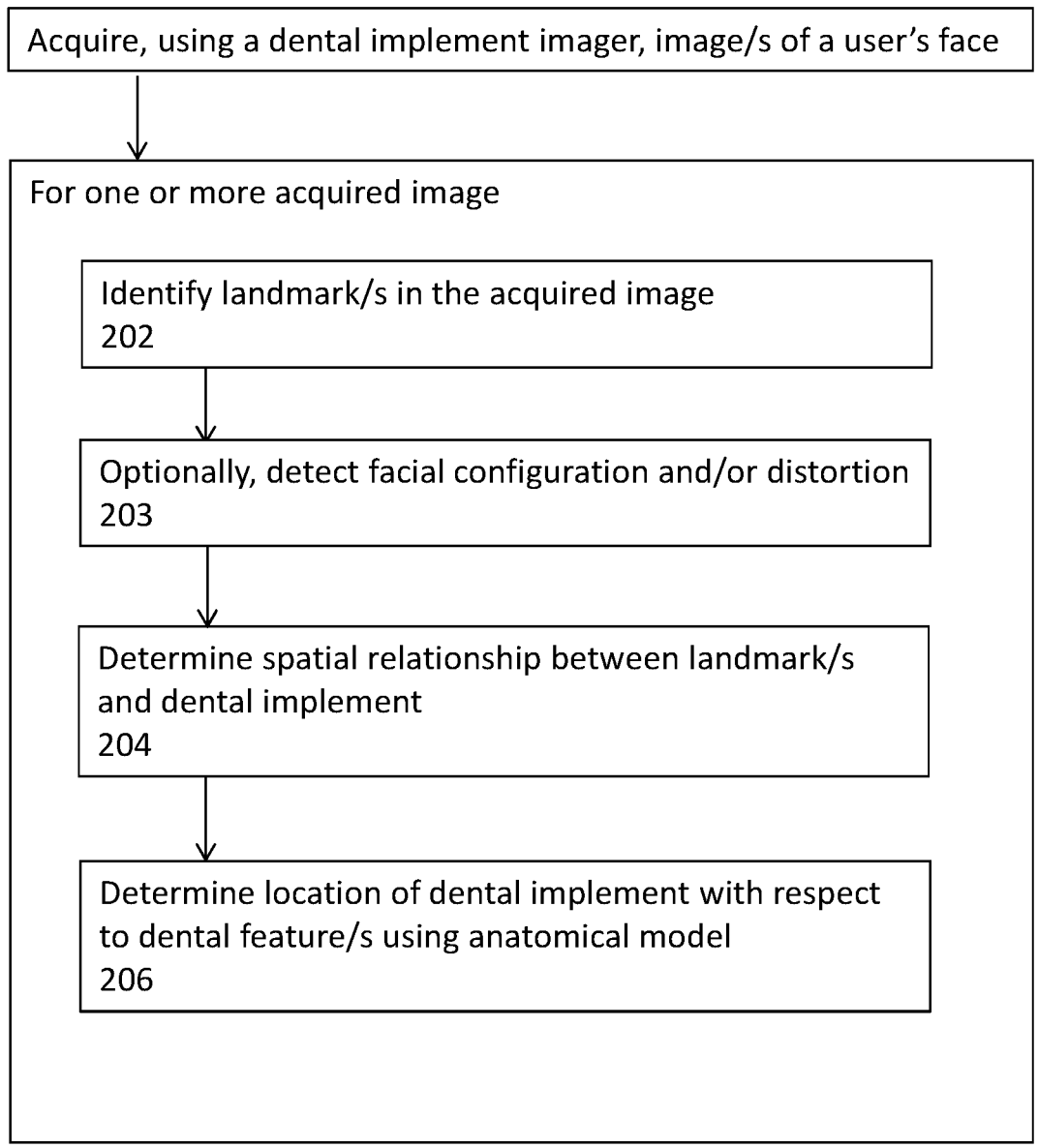
FIG. 2 is a flowchart of a method of dental device tracking, according to some embodiments of the invention.

FIG. 2 is a flowchart of a method of dental device tracking, according to some embodiments of the invention.

At 200, in some embodiments, one or more image including user body portion/s outside the oral cavity is acquired. In some embodiments, the image/s are acquired using a dental device imager. Additionally or alternatively, in some embodiments, image/s are collected by one or more external imager e.g. including one or more feature as described and/or illustrated regarding imager 190, FIGS. 1A-1B.

In some embodiments, the dental device is a toothbrush (e.g. including one or more feature as described and/or illustrated regarding one or more of FIGS. 1A-1B, 3-5, 7A-7C, 10, 11).

In some embodiments, image/s are collected during use of the dental device, for example, tooth brushing with the toothbrush.

In some embodiments, one or more image includes at least a portion of a user's body outside of the oral cavity. For example, in some embodiments, one or more image includes at least a portion of the user's face. In some embodiments, one or more image includes at least a portion of the dental device. In some embodiments, one or more single image includes both at least a portion of the user's body and at least a portion of the dental device. In some embodiments, an image includes a reflection e.g. as described regarding reflection 430, FIG. 4.

In some embodiments, for one or more acquired image:

At 202, in some embodiments, one or more user body portion is identified in the acquired image. For example, in some embodiments, one or more anatomical landmark (e.g. facial landmark) is identified. In some embodiments, one or more angle between landmarks and/or distance between identified landmarks is determined.

Alternatively or additionally, in some embodiments, tracking of the dental device includes template based identification e.g. of one or more body portion and/or of the dental device. Where, for example, in some embodiments, a template (e.g. facial template) is aligned with the image (e.g. of at least a portion of the user's face), providing a position and/or orientation of user body parts (e.g. of the face) in the image, for example, with respect to the imager and/or dental device.

In some embodiments, a template includes a landmark map for one or more facial feature, where the landmark map is distorted and/or orientated to fit an individual user and/or user posture.

In some embodiments, different techniques are used for different orientations of the dental device. For example, when a user is brushing upper teeth, an imager disposed on the bristle side of the toothbrush potentially views more facial features (e.g. eyes, nose, ears) than the same imager when a user is brushing lower jaw teeth. Furthermore, lower jaw teeth may move more with respect to one or more facial feature (e.g. eye/s, nose) due to movement of the user's jaw.

In some embodiments, different imagers are used for different orientations of the dental device. For example, a first imager imaging upper face portions during brushing of lower teeth and a second imager imaging upper face portions during brushing of upper teeth.

Alternatively or additionally, in some embodiments, different landmarks are identified in images for different orientations of the dental device e.g. in some embodiments, facial landmarks are extracted from the upper face when brushing upper jaw teeth and from the lower face (e.g. chin landmark/s) when brushing lower jaw teeth.

In some embodiments, a user's face includes more than one landmark. For example, in some embodiments, landmarks include one or more of a chin outline, distance/s between region/s of the lips and the chin, a location and/or shape of a chin dimple and/or other spatial metric/s correlated with the mandibular bone structure and/or fleshy areas of the face.

In some embodiments, a single facial feature includes a plurality of landmarks. Where in some embodiments, the plurality of landmarks are fit to image/s collected of the facial feature. For example, in some embodiments, an eyebrow contour includes several landmarks to describe an arc of the eyebrow.

In some embodiments, identification of user body portion characteristics (e.g. 3D characteristics e.g. of the lower jaw) includes detection of landmark/s in 2D and/or 3D and/or using color.

Optionally, in some embodiments, at least a portion of the dental device is identified in the acquired image. For example, in some embodiments, the dental device includes one or more marking which is identified in image/s. In some embodiments, the dental device includes more than one marking and/or landmark where, in some embodiments, an angle of the dental device in space is derived from relative position between recognized markings (and/or landmarks).

In some embodiments, an angle of the dental device, relative to user body portion/s e.g. facial feature/s is identified from image/s. In some embodiments, an angle of a mirror with respect to a user (e.g. a user's face) is identified from image/s, e.g. from image/s of a reflection in the mirror.

In some embodiments, a position of one or more part of the dental device is inferred from image/s collected by dental device imager/s, without identifying the dental device from image/s (for example, where image/s do not include the dental device). In some embodiments, a dental device imager acquiring image/s is in a known position on the dental device and/or dental device dimension/s are known, for example, enabling identification of position of portion/s of the dental device from images collected by device imager/s.

In some embodiments, a determined position of one or more facial feature (e.g. of the nostrils) is used to determine position of the teeth. In some embodiments determining of position, includes using a 3D rotational matrix for a facial portion which has been estimated for another facial portion. For example, in some embodiments, determined rotation of a first landmark and/or set of landmarks (e.g. user nose) is used to determine rotation of a second body portion and/or landmark and/or set of landmarks (e.g. the upper jaw).

In some embodiments, a weight of a landmark and/or set of landmarks (e.g. associated with a single facial feature e.g. eye) is based on measured visibility of the landmark and/or set of landmarks. For example, in some embodiments, nostrils are weighted higher in determining position/s, for example, when the nostrils have a high intensity contrast and are used in determining position/s in low illumination and/or a foggy environment.

Optionally, at 203, in some embodiments, a facial configuration and/or facial distortion is identified. For example, in some embodiments, a jaw configuration is identified, e.g., an extent to which the jaw is open e.g. a position of the mandible e.g. the mandibular angle relative to the upper jaw e.g. with respect to the skull and/or upper jaw.

For example, in some embodiments, a jaw configuration is identified using relative position between two or more landmarks e.g. a position of a portion of the mandible with respect to one or more upper portion of the face e.g. maxilla, nose, eye. For example, in some embodiments, a jaw configuration is estimated by measuring a distance between upper and lower teeth, e.g. from one or more image including both at least one upper jaw tooth portion and at least one lower jaw tooth portion.

In some embodiments, a general anatomical model (e.g. not an individual anatomical model) is fitted to measurements extracted from an image to determine jaw configuration.

In some embodiments, a jaw configuration is estimated using a location of the toothbrush head and/or bristles when touching the lower jaw (mandible) e.g. touching lower jaw teeth, relative to a position of the upper jaw (e.g. the skull, e.g. determined using image/s) and using a known possible 3D relationship between the two jaws according to the temporomandibular joints (TMJ).

At 204, in some embodiments, a spatial relationship between the identified body portion/s and toothbrush are determined.

In some embodiments, a spatial relationship between the identified user body portion/s and the toothbrush is determined using the acquired image.

In some embodiments, the spatial relationship is determined from acquired image/s (which in some embodiments do not include a portion of the toothbrush) using Simultaneous Localization And Mapping (SLAM) technique/s. In some embodiments, the spatial relationship is determined using an identified position of the toothbrush and the identified body portion/s in the acquired image. In some embodiments, other landmarks are used as markers for determining spatial relationships from images, for example, stationary landmarks in a scene around the user.

In some embodiments, an identified position of a template (e.g. facial template) with respect to the dental device is used to determine the position of the toothbrush.

Alternatively or additionally, in some embodiments, the spatial relationship is determined from acquired image/s of body portion/s illuminated with patterned light. Where, in some embodiments, illumination is provided by a projector coupled to and/or mounted on and/or at least partially within the toothbrush e.g. as described and/or illustrated in FIG. 5. For example, as mentioned elsewhere in this document, in some embodiments, illumination is using visible light and/or non-visible light (e.g. infrared). In some embodiments, depth information of the illuminated user portion/s is inferred from changes to the projected light pattern observed in acquired images.

Additionally or alternatively, in some embodiments, the spatial relationship is determined using an anatomical model including identified user body portion/s where, for example, appearance of the identified body portion/s in the acquired image enables a position of the imager (e.g. and then of other portion/s of the toothbrush, if the toothbrush imager location is known) to be inferred from collected images and the anatomical map.

In some embodiments, the user body portion/s include portion/s of the face and/or head. Where, for example, recognized landmarks include a shape of user's head, an outer contour of a portion of the user's body, one or more facial feature e.g. facial topography, nose, nostril, eye, ear, chin, jaw line, facial marking/s e.g. birthmark, tattoo, freckle, mole, scar.

In some embodiments, the anatomical model is a model stored in a memory (e.g. memory 112 FIGS. 1A-1B). In some embodiments the model is based on standard and/or average human anatomy and/or anatomical spatial relationships and/or ratios.

In some embodiments, the anatomical model is selected from a plurality of models stored in a memory. For example, where a model is selected form the plurality of models for a particular user. For example, models including standard and/or average human anatomy and/or anatomical spatial relationships and/or ratios for a range of user parameters, for example, including one or more of user sex, user age (e.g. child/adult), one or more user measurement (e.g. height, weight). In some embodiments, a standard anatomical model saved in a memory is adjusted based on one or more user parameter. In some embodiments, user parameter/s are entered into the system through a user interface.

In some embodiments, the anatomical model is based on imaging data of a user. Where, in some embodiments, the system receives imaging data from an external source (e.g. intraoral scanner (IOS) and/or x-ray, MRI, CT, ultrasound) and generates the anatomical model from the imaging data. In some embodiments, the system receives an anatomical model based on imaging data from an external source.

In some embodiments, the anatomical model is generated using measurements collected by the dental device. For example, where measurements include images collected during brushing with the toothbrush and/or during scanning using the toothbrush and/or using a calibration head affixed to the body of the dental device (e.g. as described and/or illustrated regarding FIG. 6 and/or FIGS. 7A-7C).

In an exemplary embodiment, a model (e.g. 3D model) of user dental features is generated using an IOS e.g. in a dental clinic. In some embodiments, the IOS includes one or more additional imager configured to measure patient body portion/s external to the oral cavity, e.g. facial feature/s. In some embodiments, the additional imager/s are located on the IOS in a similar spatial relationship to imager/s on the dental device. In some embodiments, e.g. during scanning of dental features by the IOS, the additional imager/s collect patient body portion images. In some embodiments, the dental feature model is augmented with patient body portion location/s. Optionally, for different facial configurations of the patient's body. In some embodiments, this augmented model is sent to the dental tracking system (e.g. system 100 FIGS. 1A-1B) e.g. via the cloud and/or by an app e.g. hosted by a user's electronic device (e.g. phone). In some embodiments, the augmented model forms the anatomical model used in dental device tracking (e.g. as described above).

A potential advantage of using the IOS to generate an anatomical model is high accuracy of IOS scanning technology for dental features. A further potential advantage of providing an anatomical model to the dental device tracking system, meaning that the system (e.g. system 100, FIGS. 1A-1B) does not need to have the processing capability for generating an anatomical model (e.g. 3D anatomical model) and/or dental device imagers have lower resolution requirements.

In some embodiments, a model includes frequently used postures (stored and/or individual to a user e.g. generated from previously collected measurements). For example, in some embodiments, a first estimate of one or more measurement is based on stored model parameter/s e.g. a frequent degree of opening of a user's mouth during brushing and/or a frequent angle of the toothbrush with respect to other landmark/s and/or dimension/s e.g. degree of opening of the user's mouth.

At 206, in some embodiments, a location of at least a portion of the dental device, with respect to one or more dental feature, is determined.

In some embodiments, a body portion identified in a collected image is identified in an anatomical model including one or more dental feature.

In some embodiments, the previously determined spatial relationship between the body portion and the toothbrush is then used to find a spatial relationship between the toothbrush and the one or more dental feature. Where, in some embodiments, exemplary anatomical models are as described regarding step 204.

In some embodiments, when an anatomical model is used to identify the toothbrush location with respect to identified user body portion/s, the same anatomical model is used to determine the location of the toothbrush with respect to the one or more dental feature. Alternatively, or additionally, a second (different) anatomical model is used.

In some embodiments, a dental tracking system (e.g. system 100 FIGS. 1A-1B) stores a different anatomical map for each user. In some embodiments, the system recognizes a user by one or more of receiving a user input through a user interface, recognizing a user identifier on an individual toothbrush attachment which a user attaches to the device before brushing, identifying a particular user from images of the user collected by the device e.g. using facial recognition.

In some embodiments, a plurality of images are collected using the toothbrush, for example, during brushing.

In some embodiments, tracking of the toothbrush with respect to dental feature/s is using data from different imagers at different times and/or location/s of the toothbrush, potentially reducing processing requirements. For example, where, in some embodiments, data is not used and/or images are not collected from obscured imager/s (e.g. by the user's hand). For example, where in some embodiments, imager data is selected and/or imager/s are selected, based on an orientation of the toothbrush and/or a position of the toothbrush in the user's mouth. Where orientation and/or position is measured using previously collected images and/or using one or more sensor signal e.g. in some embodiments, the dental implement includes one or more accelerometer and/or gyroscope, where accelerometer and/or gyroscope signal/s, for example, provide orientation data.

In some embodiments, toothbrush tracking with respect to dental feature/s is determined from images collected of the toothbrush and/or the dental feature/s (e.g. images showing contact between the toothbrush and dental features. In some embodiments, imaging of body portion/s outside the oral cavity is used when the toothbrush and/or oral cavity is obscured and/or when the accuracy of tracking of the toothbrush using imaging inside the oral cavity is insufficient (e.g. falls below a threshold).

In some embodiments, collected images are securely stored, for example, in a memory e.g. to protect user privacy. In some embodiments, images are not directly stored. For example, in some embodiments, landmarks and/or other data associated with image/s are saved.

Figure 3:
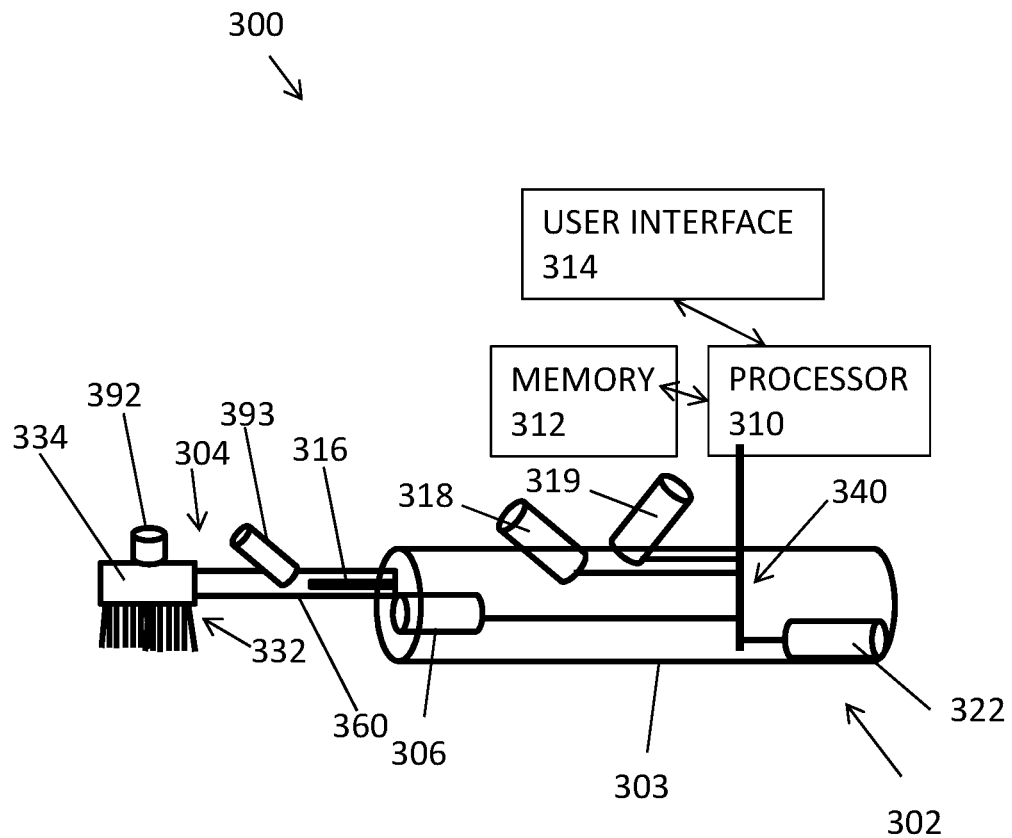
FIG. 3 is a simplified schematic of a toothbrush including a plurality of imagers according to some embodiments of the invention.

FIG. 3 is a simplified schematic of a toothbrush 302 including a plurality of imagers 306, 318, 322, 392, 393, 319, according to some embodiments of the invention.

In some embodiments, toothbrush 302 includes a head portion 304 and a body portion 303 which are, in some embodiments connected (e.g. as described regarding toothbrush 102, FIGS. 1A-1B) e.g. by a connector 316.

In some embodiments, toothbrush 302 is part of a system 300. Where, in some embodiments, system 300 includes one or more of a user interface 314, a memory 312, a processor 310. In some embodiments, one or more of user interface 314, a memory 312, a processor 310 are part of toothbrush 302. In some embodiments, one or more of imagers 306, 318, 319, 322, 392, 393 includes a data connection 340 to processor 310.

In some embodiments, toothbrush 302 includes one or more oral cavity imager 306 which is configured (for example, positioned and/or orientated and/or with suitable FOV) for imaging dental features within a user's oral cavity, e.g. when the toothbrush is in use. Optionally, in some embodiments, oral cavity imager 306 is also configured to collect images of portion/s of a user's body outside the oral cavity, e.g. as illustrated and/or described regarding FIGS. 1A-1B.

In some embodiments, toothbrush 302 includes one or more user imager 318 which is configured (for example, positioned and/or orientated and/or with suitable FOV) for direct imaging of body portion/s of the user outside the user's oral cavity. In some embodiments, user imager 318 is configured to collect images of the user's face and/or head.

In some embodiments, toothbrush 302 includes one or more reflection imager 322, 319 which is configured (for example, positioned and/or orientated and/or with suitable FOV) for imaging a reflection of the user using toothbrush 302. In some embodiments, a reflection imager 322 is disposed at a distal portion (e.g. end) of toothbrush 322 (e.g. of handle 303), where toothbrush head 304, in some embodiments, forms a proximal portion of the toothbrush. In some embodiments, a reflection imager 322 is located on a side of handle 303.

In some embodiments, toothbrush 302 includes only one of imagers 306, 318, 322, or only two of the imagers. For example, in some embodiments, the toothbrush only includes imager 318, or only includes imager 322, or only includes imagers 318, 322, the imagers generally not collecting images of the oral cavity.

Figure 7A:
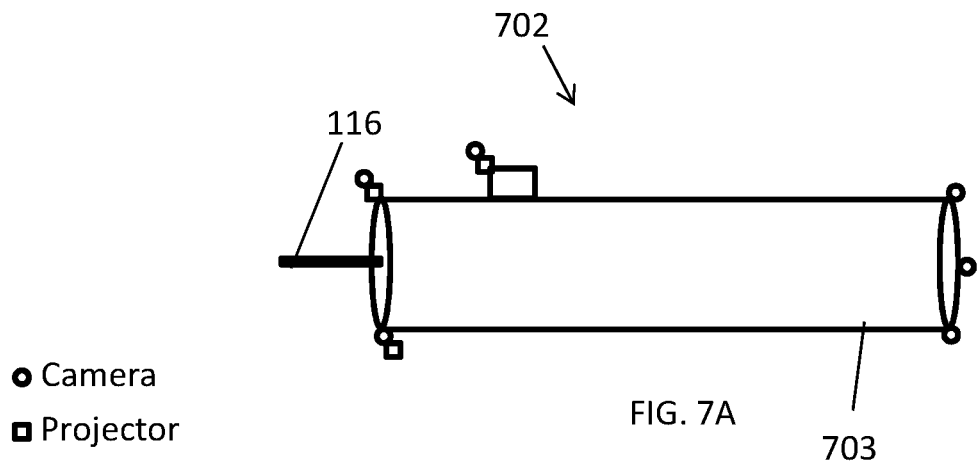
FIG. 7A is a simplified schematic of a dental device, according to some embodiments of the invention.
Figure 7B:
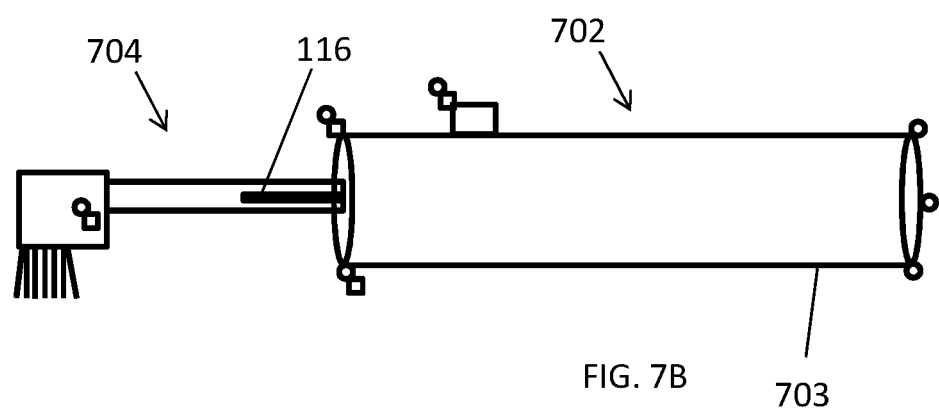
FIG. 7B is a simplified schematic of a dental device including a toothbrush attachment, according to some embodiments of the invention.
Figure 7C:
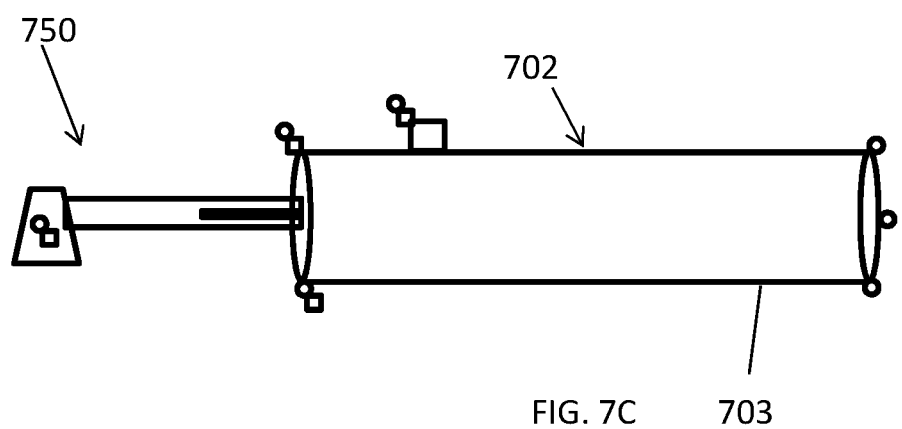
FIG. 7C is a simplified schematic of a dental device, including a calibration attachment, according to some embodiments of the invention.

In some embodiments, toothbrush 302 includes more than 3 imagers, for example, 3-10 imagers, e.g. as illustrated in FIGS. 7A-7C.

A potential benefit of more than one imager, and/or of a larger number of imagers, is the ability to collect images of user body portion/s (e.g. of user facial feature/s) during (e.g. throughout) brushing. Where, for example, during brushing of different teeth, a user changes grasp of the toothbrush handle and/or orientation of the toothbrush with respect to the user's face, potentially covering different portion/s of the toothbrush handle with the user's hand and/or orientating different portions of the handle away from the user and/or the user's face.

In some embodiments, two or more imagers have overlapping FOVs, potentially enabling imaging of facial feature/s, e.g. the nostrils and/or enabling collection of 3D imaging of the facial feature/s.

In some embodiments, an imager, for example a 3D imager, (e.g. active stereo and/or time of flight) has a field of view which images facial feature/s, e.g. the nostrils. In some embodiments, facial feature/s (e.g. nostrils) are used for identifying the 3D location and/or orientation of the dental implement (e.g. toothbrush). In some embodiments, toothbrush 302 includes data connection/s 340 to a processor 310. In some embodiments, imagers 306, 318, 322 are connected to processor 310, for example, sending image data to and/or receiving command signals from processor 310.

Optionally, in some embodiments, toothbrush 302 includes an imager 392 located on (e.g. mounted on e.g. attached to) the dental device head 304. In some embodiments, imager 392 is located on a portion of base 334 lacking bristles.

Optionally, in some embodiments, toothbrush 302 includes an imager 393 located on (e.g. mounted on and/or attached to) a neck 360 of toothbrush.

In some embodiments, imager 392 and/or imager 393 are configured (e.g. has FOV suitable for) acquisition of images from inside the oral cavity. For example, when the toothbrush head is within the oral cavity e.g. before during brushing.

In some embodiments, optical data collected includes images from inside the oral cavity. In some embodiments, image/s from inside the oral cavity are used to provide feedback (e.g. to a user) additionally or alternatively to other system tracking data and/or acquired image/s.

In some embodiments, image processing (e.g. performed by a processor e.g. processor 310) is performed on image/s acquired from inside the oral cavity, e.g. to identify portions of debris within the mouth (e.g. food caught between teeth). In some embodiments, feedback includes guidance as to cleaning the teeth, guidance, for example, including one or more of position of portion/s to be cleaned and/or a tool to be used e.g. the toothbrush and/or another dental tool (e.g. dental floss).

In some embodiments, imager 392 and/or imager 393 are configured to view teeth while brushing, i.e. the FOV/s of one or more of the imager/s are directed towards the teeth during brushing, for example, towards a mouth region which is being brushed (e.g. imager 392) and/or towards other teeth (e.g. imager 393).

In some embodiments, imager 392 is orientated in an opposite direction to a general direction of extension of bristles and/or in a direction configured so that imager 392 collects images of dental structures in an opposing jaw to the jaw being brushed and/or an opposing portion of a jaw being brushed. For example, in some embodiments, when bristles 332 are brushing a top surface of teeth in a user's lower jaw, imager collects images of teeth in the upper jaw. For example, in some embodiments, when bristles 332 are brushing an inner jaw portion imager collects images of teeth in an opposite side of the jaw.

Figure 4:
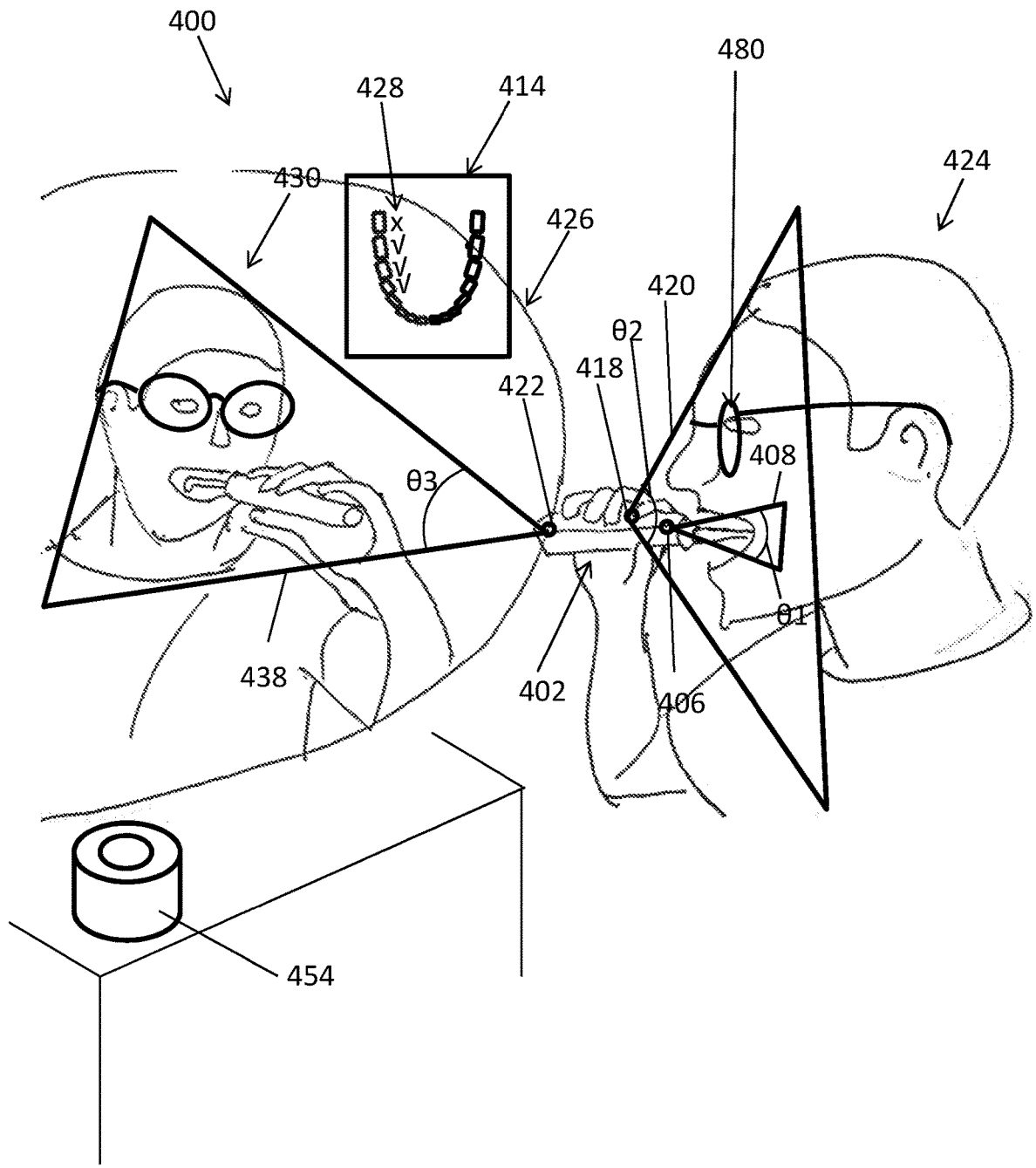
FIG. 4 is a simplified schematic of a user using a toothbrush tracking system, according to some embodiments of the invention.

FIG. 4 is a simplified schematic of a user 424 using a toothbrush 402 tracking system 400, according to some embodiments of the invention.

In some embodiments, user 424 is positioned in front of a mirror 426 and a reflection 430 of user 424 is reflected by mirror 426. Potentially, acquiring reflection images enables collection of image/s of the user and/or dental device when a line of sight of imager/s to the user and/or dental device is obscured.

In some embodiments, mirror 426 includes one or more heating element, for example, to prevent and/or reduce obscuring of the mirror surface (e.g. of the user's reflection) by condensation.

In some embodiments, toothbrush 402 includes one or more of an oral cavity imager 406, a user imager 418, a reflection imager 422 (e.g. including one or more feature as illustrated and/or described regarding oral cavity imager 306, a user imager 318, a reflection imager 322 FIG. 3).

In some embodiments, FIG. 4 illustrates exemplary FOVs of the imagers.

Where, for example, FOV 408 of oral cavity imager 406 is configured to image oral cavity areas when the toothbrush is being used. In some embodiments, a FOV angle θ1 (e.g. aperture of cone-shaped FOV) of oral cavity imager 406 is 0-180°, or 30-90°, or about 60°, or lower or higher or intermediate angles or ranges.

Where, for example, FOV 420 of user imager 418 is configured to image user body portions, e.g. user facial portion/s, e.g. the entire user face, when the toothbrush is being used. In some embodiments, a FOV angle θ2 (e.g. aperture of cone-shaped FOV) of user imager 418 is or 60-150°, or about 120°, or lower or higher or intermediate angles or ranges.

In some embodiments, one or more imager has FOV of 180°, for example, in some embodiments, the toothbrush has two imagers each with FOV of 180°. In some embodiments, one or more imager has FOV of 180-360°.

Where, for example, FOV 408 of reflection imager 422 is configured to image a reflection 430 of user 424 when the toothbrush is being used. In some embodiments, a FOV angle θ3 (e.g. aperture of cone-shaped FOV) of reflection imager 422 is 30-180°, or 60-150°, or about 120°, or lower or higher or intermediate angles or ranges.

In some embodiments, system 400 includes one or more user interface 414 which, in some embodiments, communicates information (e.g. feedback e.g. on brushing performance) to user 424.

In some embodiments, user interface/s 414 communicate wirelessly with a processor (e.g. processor 110 FIGS. 1A-1B), for example, receiving control signals instructing information to be displayed. In some embodiments, alternatively or additionally, a user interface (e.g. display), which, in some embodiments, is used to communicate feedback to a user, is mounted on toothbrush 402.

In some embodiments, user interface/s 414 include a screen which displays visual information to a user. For example, in some embodiments, user interface display 414 is attached to and/or near mirror 426. In some embodiments, user interface 414 includes one or more projector, where, for example, in some embodiments, the projector projects visual information onto a surface 426 and/or onto a surface within a user's field of view (FOV) when the user is brushing using mirror 426.

In some embodiments, user interface/s 414 include one or more speaker, for example, to provide audio instructions and/or feedback to a user.

In some embodiments, system 400 includes one or more base 454.

In some embodiments, 454 includes a charging port including contacts for charging toothbrush 402. Alternatively or additionally, in some embodiments, 454 includes one or more user interface. For example, one or more of a display, one or more speaker. In some embodiments, base and/or electronic component/s of base are water-sealed.

In some embodiments, feedback 428 regarding brushing performance and/or instructions to the user are displayed to a user by display/s 414, 454.

In some embodiments, base 454 includes a user interface which provides feedback to the user. For example, in some embodiments, base 454 includes a representation of user jaw/s and/or teeth where, once a portion of the user's mouth has been sufficiently brushed, an indication is displayed on the representation for that portion of the user's mouth.

In some embodiments, the indication displayed on the representation includes one or more of increase in light intensity, decrease in light intensity, change in color. For example, in some embodiments, the representation changes color for a tooth and/or tooth portion once the tooth is brushed e.g. changing (in some embodiments, gradually) from a first color (e.g. red) to a second color (e.g. cyan) when the tooth and/or tooth portion is clean.

In some embodiments, the representation is a screen display e.g. of a jaw and/or mouth and/or teeth. Alternatively or additionally, in some embodiments, the representation is a physical model (e.g. molded plastic) of the mouth and/or teeth where, for example, sufficiently brushed regions are illuminated e.g. by one or more light source (e.g. LED) within the physical model.

Alternatively or additionally, in some embodiments, a user interface communicates with a user (e.g. feedback) through non-visual cues for example aural (e.g. speech and/or noise and/or sound cues) and/or motion cues (e.g. vibration of a portion of the dental device e.g. haptic feedback). For example, in some embodiments, an external user interface (e.g. toothbrush base, display on a mirror, portable electronic device, earphones) and/or toothbrush user interface produces sound feedback and/or vibration feedback to a user.

In some embodiments, display 414 is an electronic device display (e.g. cell phone display, and/or tablet display and/or computer display) where the electronic device includes software (e.g. installed by downloading an "app") configured to receive control signals from a system processor and to communicate information (e.g. visually, and/or aurally (display 414 in some embodiments, includes one or more speaker), and/or by motion) based on the control signals.

In some embodiments, system 400 includes one or more wearable element 480. In some embodiments, a wearable element is a pair of glasses 480, where in some embodiments system 400 and/or glasses 480 include one or more feature as described regarding and/or illustrated system 1300 and/or glasses 1380, FIG. 13.

In some embodiments, system 400 includes one or more position sensor. For example, in some embodiments, dental implement 402 includes one or more position sensor e.g. one or more electromagnetic tracker. Where, for example, measurement of position of the dental implement is with respect to one or more other system electromagnetic tracker e.g. of one or both of glasses 480 and holder 454. In some embodiments, the toothbrush tracker is an electromagnetic sensor and the other tracker/s are electromagnet/s. In some embodiments, the toothbrush tracker is an electromagnet and the other tracker/s are electromagnetic sensor/s. in some embodiments, tracker/s send position data to a processor (e.g. processor 110). A potential advantage of a tracker in a wearable element, where the element is worn on the head is that relative movement between the wearable element tracker and dental feature/s is reduced.

In some embodiments, tracking includes one or more feature as illustrated and/or described in International patent Application No. PCT/IL2018/050730 filed 4 Jul. 2018, which is herein incorporated by reference in its entirety.

Figure 5:
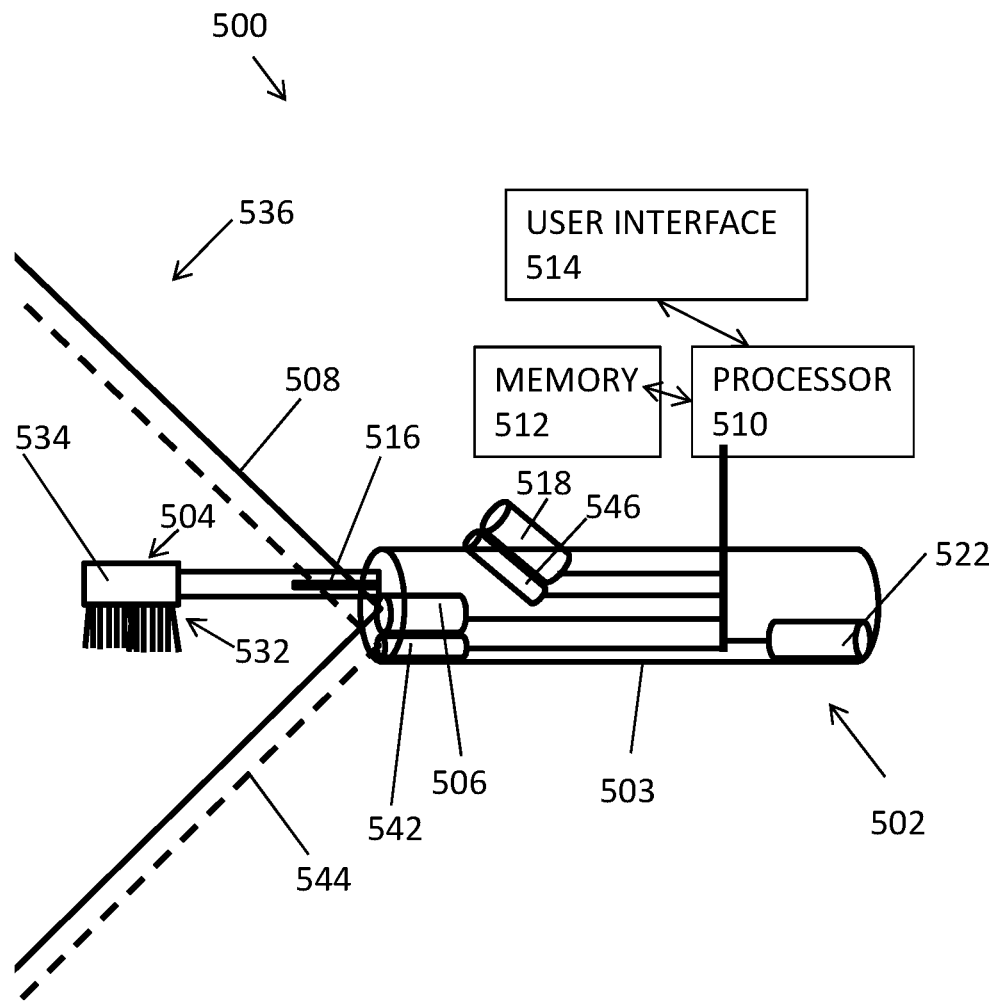
FIG. 5 is a simplified schematic of a toothbrush including one or more light projector, according to some embodiments of the invention.

FIG. 5 is a simplified schematic of a toothbrush 502 including one or more light projector 542, 546, according to some embodiments of the invention.

In some embodiments, one or more of light projectors 542, 546 includes one or more light, for example, to illuminate region/s for collection of images. Alternatively or additionally, in some embodiments, one or more of light projectors 542, 546 is configured to project patterned light. In some embodiments, projected light is visible.

Alternatively or additionally, in some embodiments, projected light is outside the visible spectrum, e.g. is infrared (where e.g. one or more imager 506, 518 includes infrared imaging sensor/s e.g. Near infrared (NIR) imaging sensor/s). A potential benefit of using non-visible light projection is user comfort, where the user is not able to detect the projected light.

In some embodiments, toothbrush 502 includes one or more imager and one or more projector. In some embodiments, an imager is disposed adjacent and/or in sufficiently close proximity to a projector that most (e.g. 60-100%, or 90-100%, or at least 90% or at least 99%, or lower or higher or intermediate ranges or percentages of) regions in the FOV of the imager are illuminated by the projector (e.g. with patterned light). In some embodiments, imager/s 506, 518 are configured to collect images of a user's reflection e.g. of light (e.g. directly and/or in a mirror) associated with projector/s 542, 546.

In some embodiments, projector 542 and imager 506 are configured for image acquisition in the intraoral cavity and, in some embodiments, use visible light pattern projection and/or sensing. In some embodiments, projector 536 and imager 528 are configured for image acquisition of facial feature/s and, in some embodiments, use infrared light pattern projection and/or sensing.

Potential benefit/s being that visible light pattern projection and image acquisition provides good contrast for tooth measurement and/or that the infrared projector does not dazzle and/or irritate the user when light is projected onto user facial feature/s.

In some embodiments, toothbrush 502 is part of a system 500 which, in some embodiments, includes one or more of a user interface 514, a memory 512, a processor 510. In some embodiments, one or more of user interface 514, a memory 512, a processor 510 are part of toothbrush 502.

Figure 6:
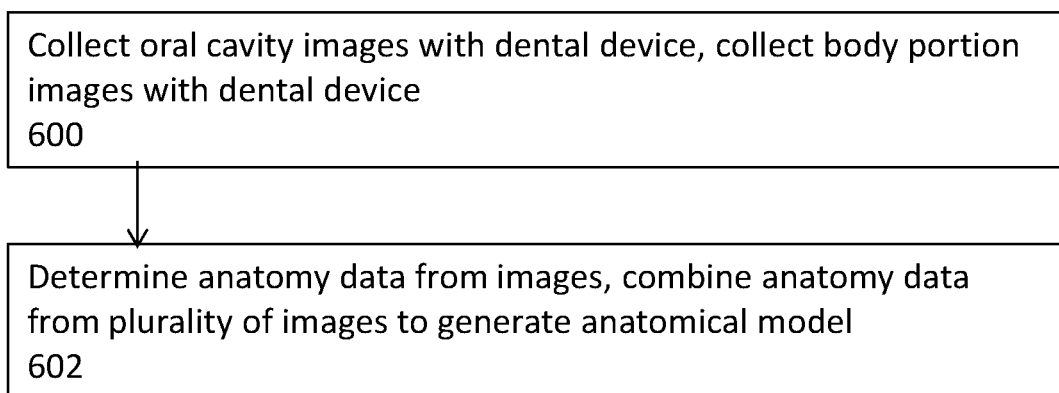
FIG. 6 is a flow chart of a method of generating an anatomical model using a dental device, according to some embodiments of the invention.

FIG. 6 is a flow chart of a method of generating an anatomical model using a dental device, according to some embodiments of the invention.

At, 600, in some embodiments, a dental device (e.g. dental device 102 FIGS. 1A-1B) is moved around inside a user's images including user body portion/s external to the oral cavity are collected by one or more imager of the dental device. Optionally, in some embodiments, images including the user's oral cavity are collected.

Alternatively or additionally, in some embodiments, other measurement/s of the oral cavity are collected, for example where dental feature/s are measured using contact data e.g. collected by one or more pressure sensor of the dental device e.g. collected by measuring deflection of a flexible neck of the toothbrush. In some embodiments, deflection of the toothbrush neck is measured using one or more strain gauge which is mounted on and/or part of the toothbrush neck.

Alternatively or additionally, in some embodiments, deflection is measured optically e.g. using one or more imager (e.g. of the toothbrush). For example, in some embodiments, deflection of a flexible neck of the toothbrush is measured optically, for example, by an imager of the toothbrush which has a FOV which includes the toothbrush neck.

In some embodiments, contact and/or a level of contact between the toothbrush bristles and user mouth portion/s (e.g. teeth) is determined using measurement of toothbrush bristle deflection. In some embodiments, bristle deflection is measured, optically, for example, by an imager of the toothbrush which has a FOV which includes the toothbrush bristles.

In some embodiments, contact impedance measurement/s are collected.

At 602, in some embodiments, user anatomy is identified from collected images, and identified user anatomy location data is combined. For example, to generate an anatomical model including user oral cavity and/or dental features and user body portion/s external to the oral cavity (e.g. including facial features).

In some embodiments, images of user body portion/s include images of a user reflection.

In some embodiments, pattern projection (e.g. as described elsewhere in this document) is used to collect depth measurements. In some embodiments, infrared pattern projection and imagers are used.

Figure 8A:
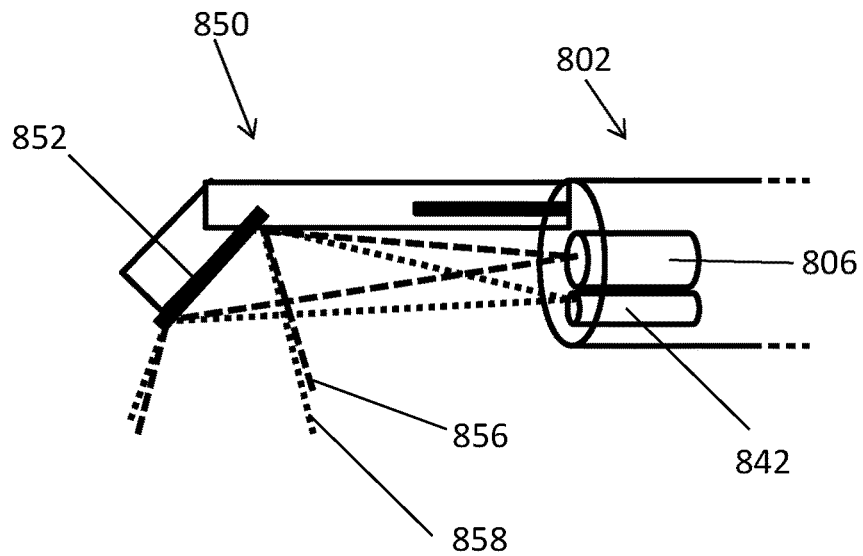
FIG. 8A is a simplified schematic of a dental device including a calibration attachment, according to some embodiments of the invention.
Figure 8B:
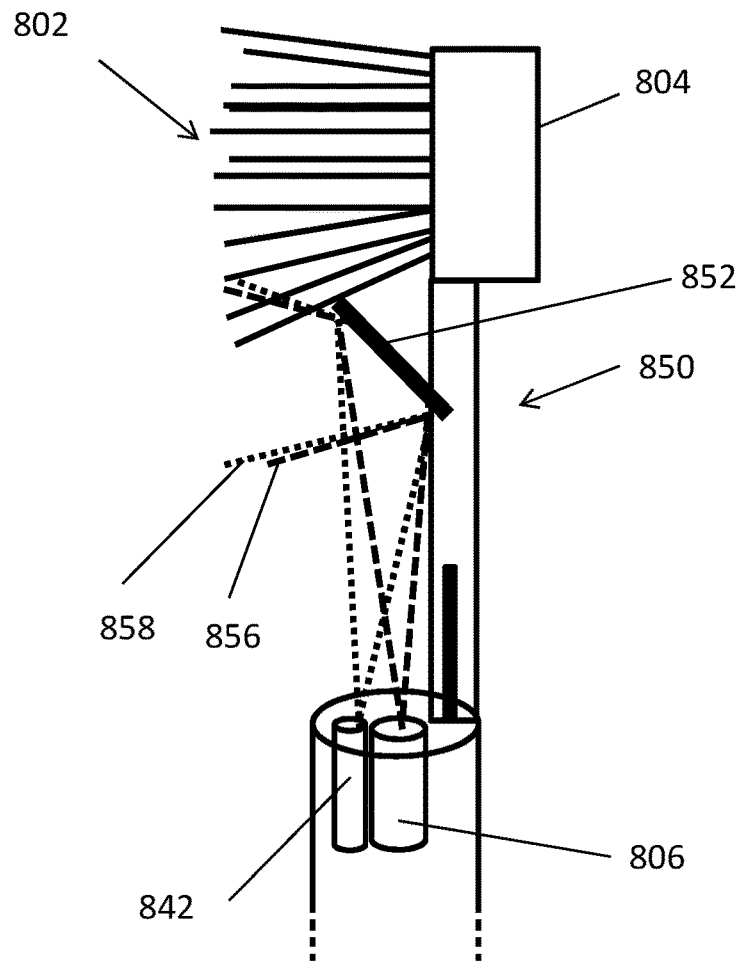
FIG. 8B is a simplified schematic of a dental device a calibration head and a toothbrush head, according to some embodiments of the invention.

In some embodiments, images for generation of an anatomical model are collected by scanning the user's mouth with a dental device connected to a calibration head (e.g. including one or more feature as described and/or illustrated regarding FIGS. 7A-7C and/or FIGS. 8A-8B).

In some embodiments, the anatomical model is generated from collected image measurements. In some embodiments, a pre-existing model (e.g. including user inputted data and/or imaging data) is adjusted and/or augmented using measurements e.g. which in some embodiments are collected with a calibration head.

In some embodiments, an anatomic model is generated once e.g. during the first use of the toothbrush and/or during use of a calibration head. In some embodiments, the anatomical model is refreshed e.g. continually e.g. with each brush and/or periodically e.g. once a month. For example, in some embodiments, a user periodically is instructed to brush without toothpaste while measurements for a new and/or corrected anatomical model are collected. For example, where a user is periodically instructed to perform calibration with the dental device (e.g. with the toothbrush with a calibration head attached).

FIG. 7A is a simplified schematic of a dental device 702, according to some embodiments of the invention.

FIG. 7B is a simplified schematic of a dental device 702 including a toothbrush attachment 704, according to some embodiments of the invention.

In some embodiments, dental device 702 includes one or more anchor 116 configured to attach the device to one or more head (e.g. where the anchor and/or attachment includes one or more feature as described and/or illustrated regarding toothbrush head 104 connection to body 103, FIGS. 1A-1B).

In some embodiments, the head is a toothbrush head 704.

In some embodiments, toothbrush head 704 is detachable by a user, for example, potentially enabling use of device 702 by different users (e.g. using different toothbrush heads) and/or replacement of a worn head.

In some embodiments, toothbrush head 704 includes an RFID tag. Where, in some embodiments, the system includes an RFID reader. In some embodiments, the system identifies a particular user (e.g. from a plurality of users) by the toothbrush head RFID which has been attached to the toothbrush body before brushing. For example, enabling automatic operation of the system for a particular user. In some embodiments, the system is enabled only for valid RFID tagged toothbrush heads e.g. preventing the use of counterfeit toothbrush heads.

In some embodiments, toothbrush head 704 includes one or more of a camera and a projector e.g. configured to collect images of dental surfaces during brushing.

FIG. 7C is a simplified schematic of a dental device, including a calibration attachment 750, according to some embodiments of the invention.

In some embodiments, e.g. as described regarding FIG. 6, calibration head 750 is attached to dental device 702 where, in some embodiments, the calibration head does not include bristles. In some embodiments, a system toothbrush attachment lacks imager/s and a system calibration head includes one or more imager and/or projector.

In some embodiments, calibration head 750 collects pressure and/or contact measurements, e.g. using one or more sensor. In some embodiments, calibration head 750 includes one or more sensor configured to measure contact impedance.

FIG. 8A is a simplified schematic of a distal portion of a dental device 802 connected to a calibration attachment 850, according to some embodiments of the invention.

In some embodiments, calibration attachment 850 includes one or more mirror 852. In some embodiments, mirror 852 is configured change a FOV 856 of an imager 806. In some embodiments, the mirror changes FOV 866 to be suitable for collection of images of dental structures. In some embodiments, calibration attachment 850 changes a region illuminated by a projector 842, e.g. to that of FOV 866. For example, for collection of depth measurement/s of dental feature/s using dental device 802 and calibration attachment 850.

A potential benefit of calibration attachment 850 is the ability to collect measurements for generation of an anatomical model (e.g. a personal anatomical calibration model) using the same imager as is configured to track toothbrush position.

In some embodiments, attachment of the calibration attachment to dental device 802 includes one or more feature as illustrated and/or described regarding attachment of toothbrush head 104 connection to body 103, FIGS. 1A-1B.

FIG. 8B is a simplified schematic of a dental device 802 including a calibration head 850 and a toothbrush head 804, according to some embodiments of the invention.

In some embodiments, dental device 802 is a toothbrush incorporating both a toothbrush head 804, and a calibration head 850. Where, in some embodiments, calibration head 850 includes one or more feature as described and/or illustrated regarding FIG. 8A. For example, in some embodiments, figure numerals of FIG. 8A correspond to figure numerals of FIG. 8B.

In some embodiments, the toothbrush is provided and/or used with both the toothbrush and calibration heads. Alternatively, in some embodiments, one or both of the toothbrush and the calibration head are removable. For example, potentially enabling replacement of the toothbrush head e.g. of a worn toothbrush head. For example, enabling initial calibration using the calibration head and then removal of the calibration head e.g. to reduce bulk of the toothbrush and/or provide an unobstructed view of the toothbrush head to the imager 806 and/or projector 842.

Exemplary Optical Properties

In some embodiments, one or more feature as described and/or illustrated in U.S. Provisional Application No. 62/662,558 which is herein incorporated by reference it its entirety, is used in conjunction with apparatus and/or methods as described within this document. In some embodiments, a referential pattern (as described in U.S. Provisional Application No. 62/662,558) is illuminated as shown schematically in FIGS. 8A and 8B, for instance through mirror 852.

In some embodiments, the referential pattern is used for bulk optical properties extraction of an illuminated object (e.g. tooth, inlays, crowns, gums, tongue, carry or other intraoral features).

Alternatively or additionally, a referential pattern is used for extraction of subsurface properties and/or surface properties and/or point properties. For example optical properties of subsurface features, areas and/or layers optical properties (i.e. not the outer surface) may be measured and/or estimated. The measured properties may be used, for example to facilitate accurate esthetic restoration.

In some embodiments, the following process may include some or all of the following actions:
Illuminate object with a referential pattern
Take an image of the object illuminated with the referential pattern
Optionally take a further image of the object, for example:
an image under ambient illumination (e.g. without pattern illumination)
an image under uniform illumination
an image under white illumination
Optionally correct pattern features and/or colors. For example, corrections may be based on data from different illumination schemes. For example, corrections to illuminated areas in a pattern may be based on data from non-illuminated areas the pattern. Alternatively or additionally, corrections may be based on images made under ambient light, uniform light and/or white illumination.
Optionally, generate a depth map of illuminated object
For a plurality of areas in the image (e.g. areas with relatively uniform properties and/or limited depth variation, for instance depth variation <5 mm) do some or all of the following optional processes:
determine local depth
estimate optics (e.g. projector and imager) local PSF (point spread function) using calibration information
Deconvolve with PSF function (i.e. remove the effect of optics defocus)
resolve the amount of light scattered through the illuminated object vs. distance from illuminated feature and illuminated feature wavelength.
compute a measure of scattering for example $\mu_s'$, $\mu_a$ (reduced scattering and absorption coefficients). Optionally the scattering coefficient will be computed as a function of depth from surface, location on object and/or illumination wavelength
Optionally, gather optical properties information for multiple illuminated locations on the object depth map (e.g. 3D model) during scan
Optionally integrate gathered optical properties information over a 3D model optionally including non-measure areas (e.g. by interpolation and/or extrapolation). For example, a 3D model may be constructed which allows estimation of optical properties vs. wavelength and/or depth within the tooth or the tissue for each location on 3D model In some embodiments, intra-oral features may be illuminated with a referential pattern. For example a referential pattern can include 7 different colors. Optionally the colors are presented in a pseudo random sequence with black regions in between.

Exemplary Measurement of Exemplary Optical Properties

In some embodiments, a tooth is illuminated with a striped pattern of colors with black gaps in between. In some embodiments photons may be reflected from tooth surface and/or scattered and/or absorbed. Without being limited to a theoretical framework, calculations may be based on an approximation, for example one possible approximation is that a photon migrating through strongly scattering media, such as tissue or teeth that enters the media at some point and is measured at another point, may follow a banana shaped volume distribution in the media. The theoretical construct and some calculations for this approximation is described for instance in Feng S. et al. al. "Monte Carlo simulation of photon migration path distributions in multiple scattering media" Proc SPIE vol. 1888, (1993). The optical properties (absorption and scattering) of the tissue are optionally extracted from the number of photons which are measured at each distance from the illuminated stripe. Additionally or alternatively, measurement of light at different distances from the illumination stripe provides information on the optical properties vs. depth from the tooth surface.

In some embodiments, said pattern can be used for detection of a biofilm (e.g. plaque), which may change the absorption and scattering at the tooth surface, but not at depth. In some embodiments the biofilm will change the reflectivity of the surface of the tooth (for example reducing reflectivity and/or darkening the shade) and/or block (obscure) a portion of the scattered light. Alternatively or additionally, the film will cause fluorescence in a frequency other than the frequency of the applied light. Optionally the presence of a biofilm and/or another fluorescing feature may be determined by returning light at a different frequency than the applied light. Optionally, the fluorescence will be combined with other changes for example change in reflectance and/or obscuring scattered light.

In some embodiments, different colors and/or the difference in properties for different wavelengths may differentiate between features (e.g. gums, teeth, restorations) and/or between healthy areas and/or unhealthy areas (for example by detecting the presence of a biofilm and/or a change in geometry (for example reduction of bone mass).

In some embodiments, the image may include conventional color and/or hyper spectral color data. Optionally, a depth map of tooth is acquired. In some embodiments, the image is corrected locally for PSF. For example, the PSF of the optical system (e.g. referential pattern projector and/or imager) may be known.

In some embodiments, the referential black gap is illuminated by light that migrates through tooth from the illuminated stripes.

In some embodiments, an image may be used to identify spectral diffuse reflectance $R_\lambda$. For example, an image of a referential pattern may be analyzed. Measured properties, for example diffusive reflectance may be corrected for the scattered light, for example by subtracting the estimated intensity of scattering. Optionally, estimation of scatter may be based on measurements made in the black referential gaps. Measured properties, for example diffusive reflectance may be corrected for the ambient illumination for example by subtracting the estimated intensity of the ambient light.

In some embodiments, an image may be used to determine a local florescence of a tooth. Optionally, an image of a referential pattern is used also for gathering local florescence of the tooth. Florescence may be interpreted to identify the presence of organic materials and/or tooth decay. The florescence is obtained, for example, by measuring the amount of light emitted at a different wavelength than the light projected onto a dental feature (e.g. a tooth). For example, light at higher wavelengths emitted from a blue illuminated area. To get accurate estimation of the concentration of the material that emits the florescence (e.g. plaque) light, the effects of ambient and/or absorption and/or scattering and/or distance and/or angle of both the absorbed and the emitted light can be compensated, for example, as described herein above.

In some embodiments, the scattering coefficient $\mu_s$ and\or the anisotropy g are used instead or together with the reduced scattering coefficient $\mu_s'$ or other optical properties or coefficients used for better description of the tooth.

The local $\mu_s'$, $\mu_a$, $R_\lambda$, florescence and any additional needed optical properties are gathered for each illuminated location on object depth map (e.g. 3D model) during the tooth scan. Some of the optical properties are also related to deeper layers (e.g. measured with dipper 'bananas') of the tooth are added at the correct depth location in the 3D model. All the gathered optical properties information over the 3D model are integrated to provide optical properties vs. wavelength and layer depth (i.e. depth below the surface) for each location on 3D model. In some embodiments all the gathered optical properties information over all 3D model is integrated to provide optical properties vs. wavelength in a 3D voxel representation of intraoral scene, e.g. each location within the teeth and gums is represented by a voxel. In some embodiments, said voxel size is 10 um or 50 um or 100 um smaller or larger. Each voxel can include information on the local optical properties or any other local properties.

In some embodiments, a depth map of the feature may be generated. Optionally, during generation of the depth map, the colors of the pattern objects will be identified and used to improve the differentiation of different patter objects and/or the mapping of position. Optionally the data may be corrected. For example, an imaged may corrected based on the structural model, and/or integrated data from objects under different lighting may be used to correct an image. For example, corrections may include corrections in the color of an object based on the distance of an object from a light source and/or based on an angle of the object with relation to the light source and/or the angle of the object to the imager. Alternatively or additionally, corrections may be based on an effect of background light and/or scattered light for example, by comparing measurements made under different lighting conditions (for example illuminated regions vs. dark regions and/or regions illuminated under one color of vs. the region illuminated with another color). For example, the position of a surface may be adjusted to account for light scattered from behind the surface. Based on the corrected image data, various properties may be determined at various parts of the image. For example, optical properties and/or their 3D distribution may be determined including color, translucency, scattering, reflectance, refractance. Corrections 2106 may include various image enhancements and/or model corrections as described for example herein below.

Identifying Intra-Oral Objects

In some embodiments, measured optical properties are used to identify an intra-oral feature. For example, an identified feature may be segmented from other features and/or objects. For example, a feature may include an object (e.g. a tooth, a filling, a biofilm, a cavity, an area where gums have receded, an area of bone loss) and/or materials (e.g. organic material, enamel, living tissue) and/or geometric element (e.g. a ridge, a hole, a boundary). Optionally the feature may be on a visible surface. Alternatively or additionally an obscured feature may be identified below a surface of a dental object (e.g. a tooth) and obscured by another object (e.g. blood, glare). For example data about optical properties at different wavelengths and/or spectroscopic data about optical properties at different locations and/or at different depths underneath the tooth surface may be used to infer material properties. For instance, material properties inferred from optical measurements may be used to identify restorations materials, dentin, enamel, decay etc. In some embodiments, a processor will be used to determine properties and/or identify features. For example, a fixed algorithm may be used to segment an image and/or identify features. In some embodiments, artificial intelligence for example including deep learning may be used. Optionally, objects identified and/or properties determined will be rendered to a user. For example, rendering may include displaying an obscured feature will with interfering objects left out and/or displaying a cross section of an object and/or highlighting certain features. Segmentation and identification for example as described herein below. For example, dental pathologies may be identified and/or signs of pathologies may be highlighted during rendering.

Tooth Segmentation and Classification

In some embodiments, to classify objects in the image, for instance tooth or gums, color (such as RGB) images are collected from patterned images. Optionally, images are made of the objects using a referential pattern, for example lines pattern as described herein above. In some embodiments, known locations of the teeth and gums are used to build a model. The color data is optionally sorted according to its location in the image with respect to the lines on the image. Data is optionally processed. For example, the locations of the illuminated lines are identified and the position of each line center is marked, as well as the position of the center of the area between each two lines—the "dark lines". Optionally color data is collected for each illuminated line and for each dark line. For example, the illuminated lines may provide measurements of the spectral reflection for each color in the pattern. The information that the dark lines optionally provides optical properties obtained from light that was scattered thorough the tooth or the tissue (for example tooth and/or gums) from the illuminated lines to the dark area in between the lines.

In some embodiments, for each pattern object (for example illuminated and/or dark lines) a model is built based on the known data to separate the teeth from the gum. This model can use, for example, RGB data, HSV data (derived from the RGB data) and/or another color format, and/or a combination of several color formats at once. The model may be built from the entirety of the data, from data from only on the dark lines, only on the illuminated lines, and/or for each line separately. The model may use one or more of classification algorithms, such as k-nearest neighbors, classification tree etc. In some embodiments, the model is built on a classification for example, on RGB and location such that for each possible RGB and location combination a classification is given. In some embodiments, this facilitates a quick rendering of classification. In some embodiments, from the model shades or each area and/or feature are identified. Optionally, the model obtained may be saved for later scans with similar referential pattern, colors and spacing. Optionally the results are output.

Further Exemplary Embodiments

Figure 9:
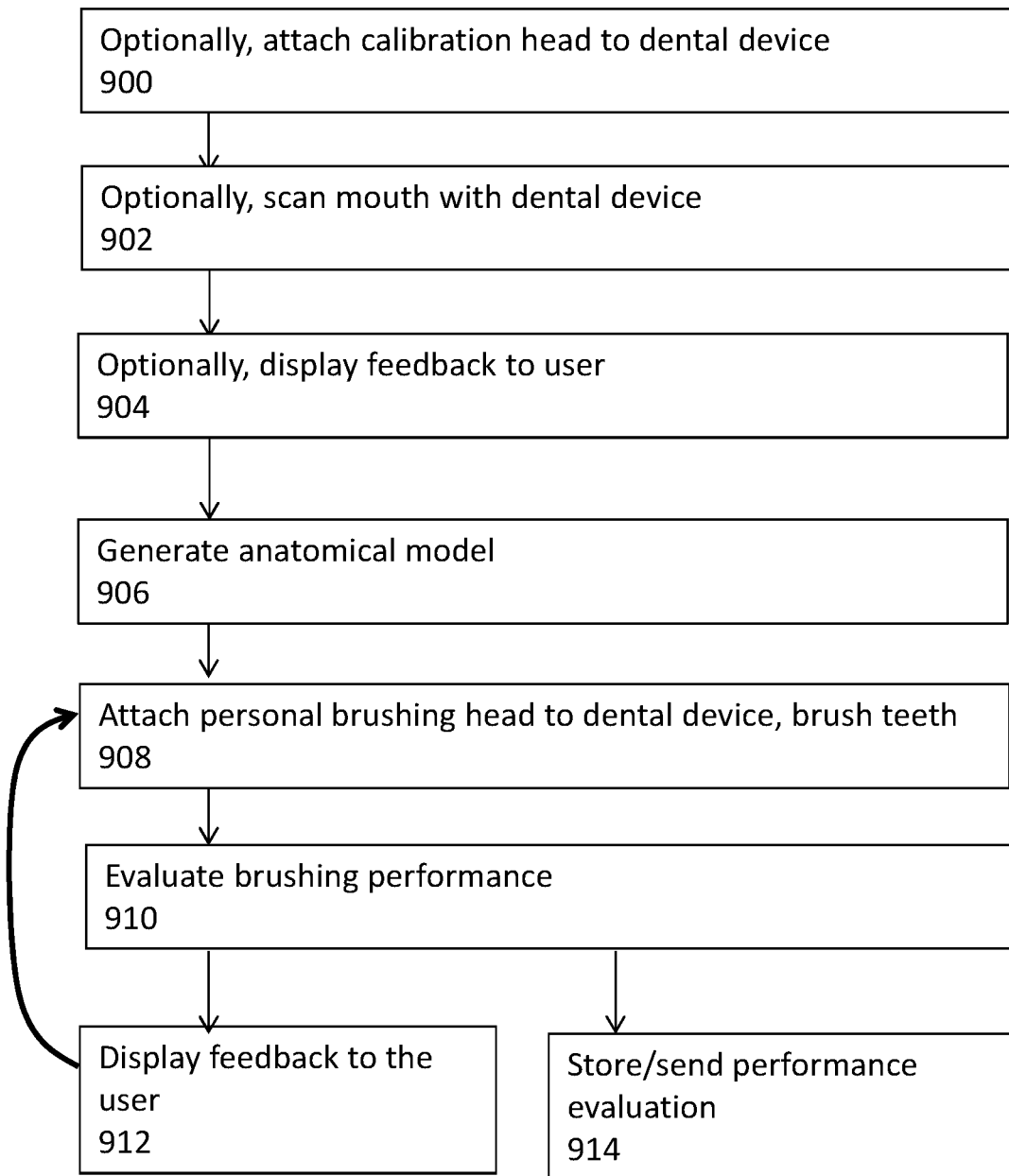
FIG. 9 is a flow chart of an exemplary method of use, according to some embodiments of the invention.

FIG. 9 is a flow chart of an exemplary method of use, according to some embodiments of the invention.

At 900, optionally, in some embodiments, a user attaches a calibration head (e.g. calibration head 750 FIG. 7C, 850 FIGS. 8A-8B) to a dental device (e.g. dental device 102 FIGS. 1A-1B, 302 FIG. 3, 402 FIG. 4, 502 FIG. 5).

At 902, optionally, in some embodiments, a user scans the user's mouth using the calibration head (e.g. upon being instructed to do so e.g. by a user interface). Alternatively or additionally, in some embodiments, scanning is performed using the dental device without a calibration head, e.g. the device including a toothbrush head and/or no head attachment. In some embodiments, the user scans (e.g. upon being is instructed to) teeth without toothpaste to build calibration model.

In some embodiments, a calibration attachment and/or head is used to measure the optical properties of a room in which the dental device is used. In some embodiments, the dental device itself is used to measure optical properties of the room.

In some embodiments, light projected from the device and/or reflected back to the device is used to measure optical properties of the environment. In some embodiments, the device (e.g. calibration head) includes a fixed feature (e.g. marker). In some embodiments, marker/s are projected onto the calibration head.

In some embodiments, light levels recorded without active illumination (e.g. by the dental device) are used to measure the ambient light. In some embodiments, displacement of the optical elements measured by tracking feature/s on the device are used to estimate environmental temperature. In some embodiments, contrast of feature/s measured on the calibration head are used to estimate the fogginess of the environment. In some embodiments, a feedback signal is generated based on collected measurements, for example, where measurement of optical properties of the environment indicate faulty imager and/or projection circuitry.

At 904, optionally, in some embodiments, a user interface displays feedback and/or instructions to the user (e.g. during scanning and/or after an initial scan) directing scanning. In some embodiments, one or more of steps 900 and 902 are performed by a technician.

At 906, in some embodiments, an anatomical model is generated using data collected by the dental device.

At 908, in some embodiments, a user attaches a personal toothbrush head to the dental device and starts to brush their teeth.

At 910, in some embodiments, brushing performance is evaluated. In some embodiments, toothbrush position data is used to evaluate brushing performance. In some embodiments, toothbrush position data is evaluated for different portions of the user's mouth, e.g. for each tooth and/or for mouth regions and/or for individual tooth surfaces.

In some embodiments, evaluation involves estimating, from position data, an extent of a surface or region that was brushed and/or duration and/or pressure of brushing. In some embodiments, additional data is used, e.g. sensor data provided by one or more sensor within the toothbrush, for example, a sensor configured to measure contact and/or pressure of contact between the toothbrush and dental surfaces. For example, in some embodiments, the toothbrush includes one or more pressure or force sensor e.g. a strain gauge on a region of the toothbrush which bends under pressure (e.g. on a neck of the toothbrush e.g. neck 160 FIGS. 1A-1B).

In some embodiments, contact impedance measurement/s are collected. Alternatively or additionally, in some embodiments, deflection is measured optically e.g. using one or more imager (e.g. of the toothbrush). For example, in some embodiments, deflection of a flexible neck of the toothbrush is measured optically, for example, by an imager of the toothbrush which has a FOV which includes the toothbrush neck.

In some embodiments, contact and/or a level of contact between the toothbrush bristles and user mouth portion/s (e.g. teeth) is determined using measurement of toothbrush bristle deflection. In some embodiments, bristle deflection is measured, optically, for example, by an imager of the toothbrush which has a FOV which includes the toothbrush bristles.

In some embodiments, measured bristle deflection (e.g. when contact is not sensed) is used to evaluate when a replacement toothbrush and/or toothbrush head is required. In some embodiments, measured bristle color is used to evaluate when a replacement toothbrush and/or toothbrush head is required. In some embodiments, upon identifying a need for a new toothbrush head, an alert is issued e.g. to the user.

In some embodiments, pressure and/or contact data (e.g. received from one or more sensor e.g. as described above), is used to generate feedback as to quality of brushing. For example in some embodiments, measured pressure and/or contact data is processed (e.g. by processor 110, 310, 510) to generate feedback to a user and/or dental practitioner. For example, by identifying which portion/s of the user's teeth were contacted and/or brushed with sufficient pressure.

In some embodiments, pressure feedback includes instructions to a user to change pressure applied pressure during brushing, for example, the feedback indicating to the user that too much or too little pressure is applied. In some embodiments, the feedback is displayed to the user during brushing and/or after brushing.

Figure 12:
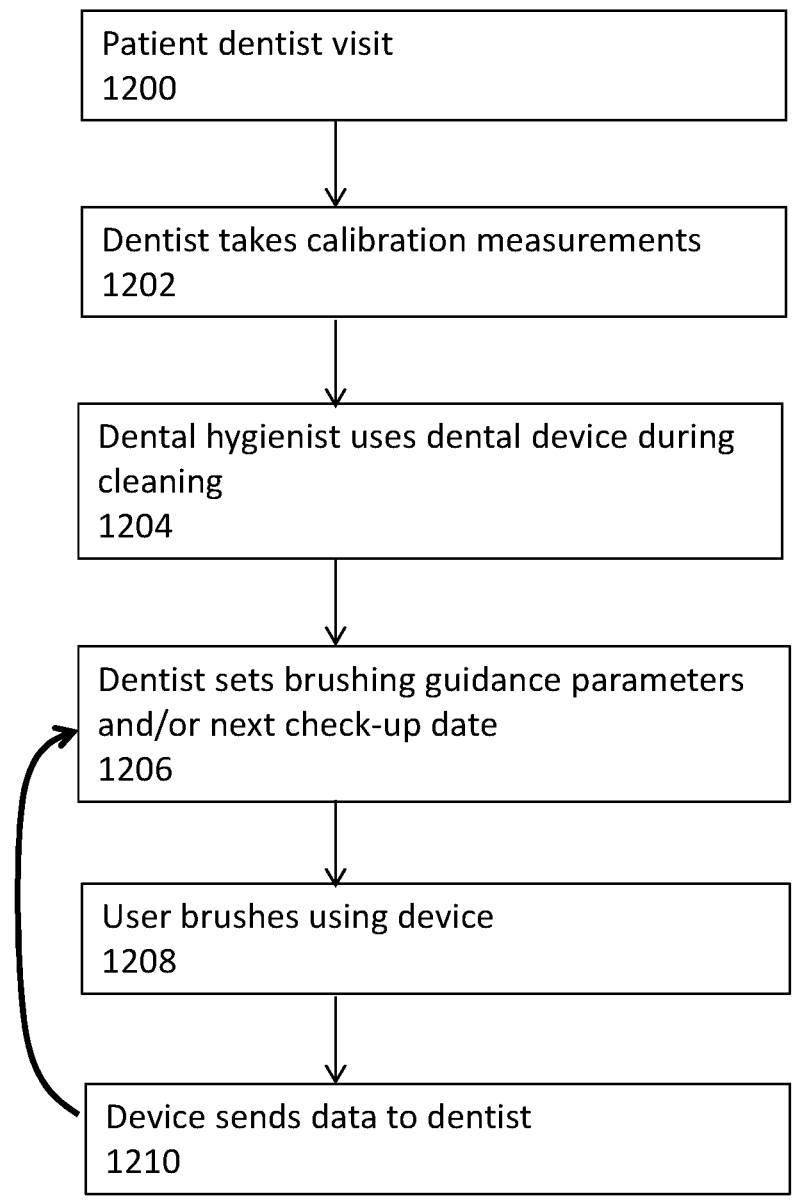
FIG. 12 is a flow chart of a method of user of a dental device, according to some embodiments of the invention.

In some embodiments, evaluation includes comparing performance with brushing guidance parameter/s, for example, as entered and/or selected by a dental practitioner (e.g. as described regarding step 1206, FIG. 12).

In some embodiments, the system includes one or more position sensor for tracking position of the toothbrush (e.g. including one or more feature as illustrated in and/or described regarding position sensor 199 FIG. 1B). Where the system (e.g. the toothbrush), in some embodiments, includes one or more electromagnetic and/or ultrasonic position sensor. Where, in some embodiments, position sensor data is used in addition to optical data for tracking position of the toothbrush.

In some embodiments, one or more measurement from one or more position sensor (e.g. one or more of position, speed, and acceleration) is combined. For example, using a filter, e.g. an extended Kalman filter to determine angular and/or spatial motion.

In some embodiments, non-imaging based tracking (e.g. using position sensor/s) is used to increase accuracy and/or robustness of tracking using imaging (e.g. as described in this document) for example, where images are collected in presence of one or more of fog, low illumination, obstruction, blur, magnetic interferences.

At 912, in some embodiments, feedback and/or guidance parameter/s are displayed to a user where, in some embodiments, display to a user includes one or more feature as described and/or illustrated regarding display 414 FIG. 4 e.g. including visual and/or aural and/or haptic feedback.

In some embodiments, feedback is displayed during brushing, for example, to assist the user (and/or user's care-giver brushing and/or supervising brushing) in brushing required areas e.g. for a desired amount of time and/or pressure. In some embodiments, feedback includes display of portion/s of the mouth e.g. requiring more attention.

For example, in some embodiments, a display includes a mouth and/or teeth map where, in some embodiments, area/s needing more brushing are indicated e.g. by different colors on the map. In some embodiments, the map includes color information received from IOS measurements. In some embodiments, the map is based on anatomical measurements of a particular user. Optionally, in some embodiments, the map includes indication of area/s which need special and/or different care (e.g. additional brushing) e.g. as specified by a dental practitioner and/or as identified by the system as being an area which requires more brushing. For example, where un-brushed areas are displayed in a first color, partially brushed areas in a second color and sufficiently brushed areas in a third color. In some embodiments, feedback during brushing includes instructions as to direction and/or force of brushing.

At 914, in some embodiments, brushing data and/or brushing performance sent to a dental practitioner (e.g. via an app) and/or other care-giver e.g. for analysis.

In some embodiments, brushing performance is stored, e.g. in a memory, for example for access by a user (or other individual). For example, enabling tracking of brushing performance and/or oral health over time.

In some embodiments, brushing data is sent to an external memory, for example, for analysis of brushing performance and/or habits of a plurality of users of the dental device.

Figure 10:
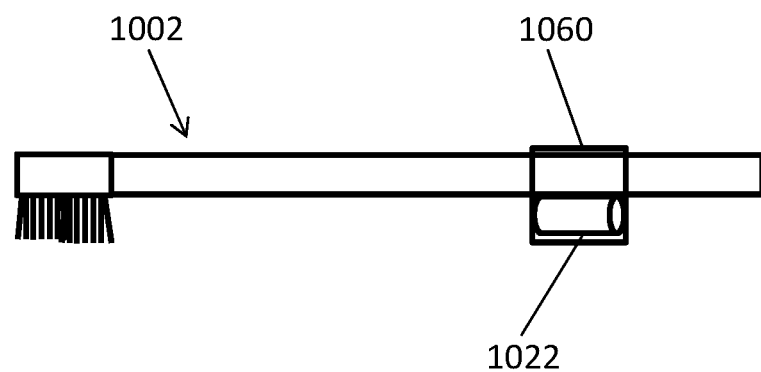
FIG. 10 is a simplified schematic of a tracking attachment connected to a toothbrush, according to some embodiments of the invention.

FIG. 10 is a simplified schematic of a tracking attachment 1060 connected to a toothbrush 1002, according to some embodiments of the invention.

In some embodiments, an attachment 1060 includes at least one imager 1022 and is configured to be attached to a toothbrush (and/or a personal care device and/or dental implement). In some embodiments, attachment 1060 includes an indentation and/or channel sized and/or shaped to receive a portion of a device (e.g. toothbrush). In some embodiments, the channel is size adjustable and/or includes high friction material e.g. potentially preventing detachment and/or movement of the tracking attachment from the toothbrush. For example, a handle of the toothbrush. In some embodiments, attachment 1060 is configured to be attached to an electric toothbrush and/or a manual toothbrush. In some embodiments, attachment 1060 includes a portion which is size adjustable for attachment to toothbrush 1002. In some embodiments, tracking attachment 1060 is connected to toothbrush 1002 by one or more connector, e.g. adhesive, screw attachment.

In some embodiments, imager 1022 is connected (e.g. wirelessly) to one or more processor (e.g. including one or more feature as described regarding processor 110 FIGS. 1A-1B). Where, in some embodiments, a connected processor is part of attachment 1060 and/or a connected processor is external to the attachment, e.g. hosted by a portable electronic device e.g. smartphone, electrical toothbrush, smart glasses.

Figure 11:
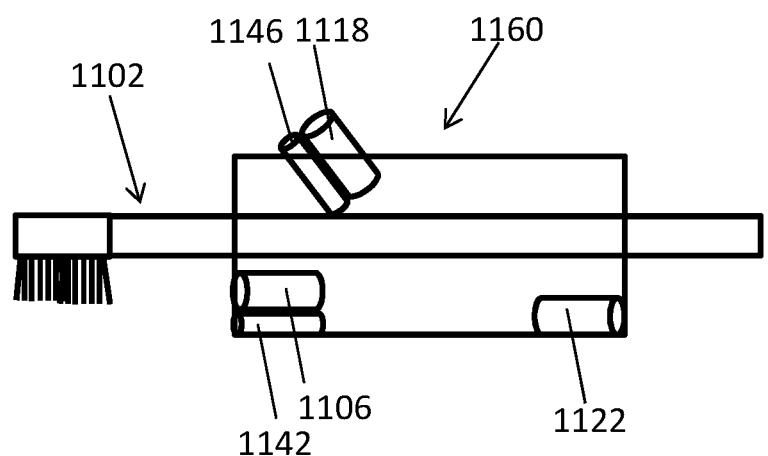
FIG. 11 is a simplified schematic of a tracking attachment connected to a toothbrush, according to some embodiments of the invention.

FIG. 11 is a simplified schematic of a tracking attachment connected to a toothbrush, according to some embodiments of the invention.

In some embodiments, tracking attachment 1160 includes one or more feature as described and/or illustrated regarding tracking attachment 1060 FIG. 10. In some embodiments, tracking attachment 1106 includes more than one imager 1106, 1118, 1112 and/or one or more projector 1142, 1146, for example, operation of imager/s and/or projector/s as described elsewhere in this document.

In some embodiments, one or more of imagers 1106, 1118, 1112 and/or projectors 1142, 1146, are connected (e.g. wirelessly) to one or more processor (e.g. including one or more feature as described regarding processor 110 FIGS. 1A-1B). Where, in some embodiments, a connected processor is part of attachment 1160 and/or a connected processor is external to the attachment, e.g. hosted by a portable electronic device e.g. smartphone, electrical toothbrush, smart glasses.

FIG. 12 is a flow chart of a method of user of a dental device, according to some embodiments of the invention.

At 1200, in some embodiments, a patient visits a dental practitioner e.g. dentist and/or dental hygienist.

Optionally, at 1202, in some embodiments, the dental practitioner collects patient calibration measurements. For example, using the dental device (e.g. including one or more feature as described and/or illustrated regarding FIGS. 6-9).

Alternatively, or additionally, in some embodiments, calibration measurements are collected using one or more additional device. For example, using an IOS. For example, using one or more additional imaging modality e.g. ultrasound, x-ray, MRI, CT either by the dental practitioner or by another practitioner and/or in a different treatment center.

Optionally, at 1204, in some embodiments, a dental practitioner uses the dental device during cleaning of the patient's teeth. For example, by brushing the patient's teeth with the dental device. For example, by attaching one or more dental implement attachment head (e.g. probe, bur) to the dental device.

In some embodiments, the dental practitioner sets guidance parameters, for example, during the patient's visit. In some embodiments, guidance parameters include guidance for user use of the device e.g. duration and/or pressure for brushing for one or more dental area, for example, specification of dental areas which require additional cleaning. In some embodiments, guidance parameters include device control instructions, for example, brushing speed and/or direction e.g. based on position of the device within the mouth. For example, pressure and/or speed of brushing e.g. based on the individual patient/s requirements.

In some embodiments, guidance parameters include instructions for one or more other treatment than brushing. For example, whitening treatments. For example, positioning of aligner/s. At 1208, in some embodiments, the user (e.g. during and/or after the dental practitioner visit) brushes teeth using the device. For example, on a daily basis and/or periodically (e.g. in some embodiments, guidance parameters include a frequency of using the device). In some embodiments, during and/or before brushing, the system communicates dental practitioner guidance parameter/s to the user. For example, through one or more user interface.

At 1210, in some embodiments, brushing data is sent to the dental practitioner, e.g. a status report of brushing performance and/or of dental health. In some embodiments, a dental practitioner (e.g. remotely) views brushing image/s (and/or footage) and provides feedback, optionally in real time where dental practitioner feedback is received by the user e.g. from one or more system display, during brushing. For example, where the dental practitioner identifies (e.g. from oral cavity images received by the dental practitioner) a dental portion needing particular care and instructs the patient to take action for this dental portion, for example brush for a longer duration.

In some embodiments, the dental practitioner determines and/or changes a future date for a patient visit, based on brushing data.

In some embodiments, based on received data the dental practitioner changes brushing guidance parameter/s, for example, between patient visits to the dental practitioner.

In some embodiments, a dental device is and/or includes, for example a flossing device, other dental tool, and/or a personal care device e.g. shaver include imager/s and/or tracking methods e.g. as described within this document. Where, for example, embodiments include the illustrated and/or described embodiments where the toothbrush head is replaced with a different dental and/or personal care tool.

Figure 13:
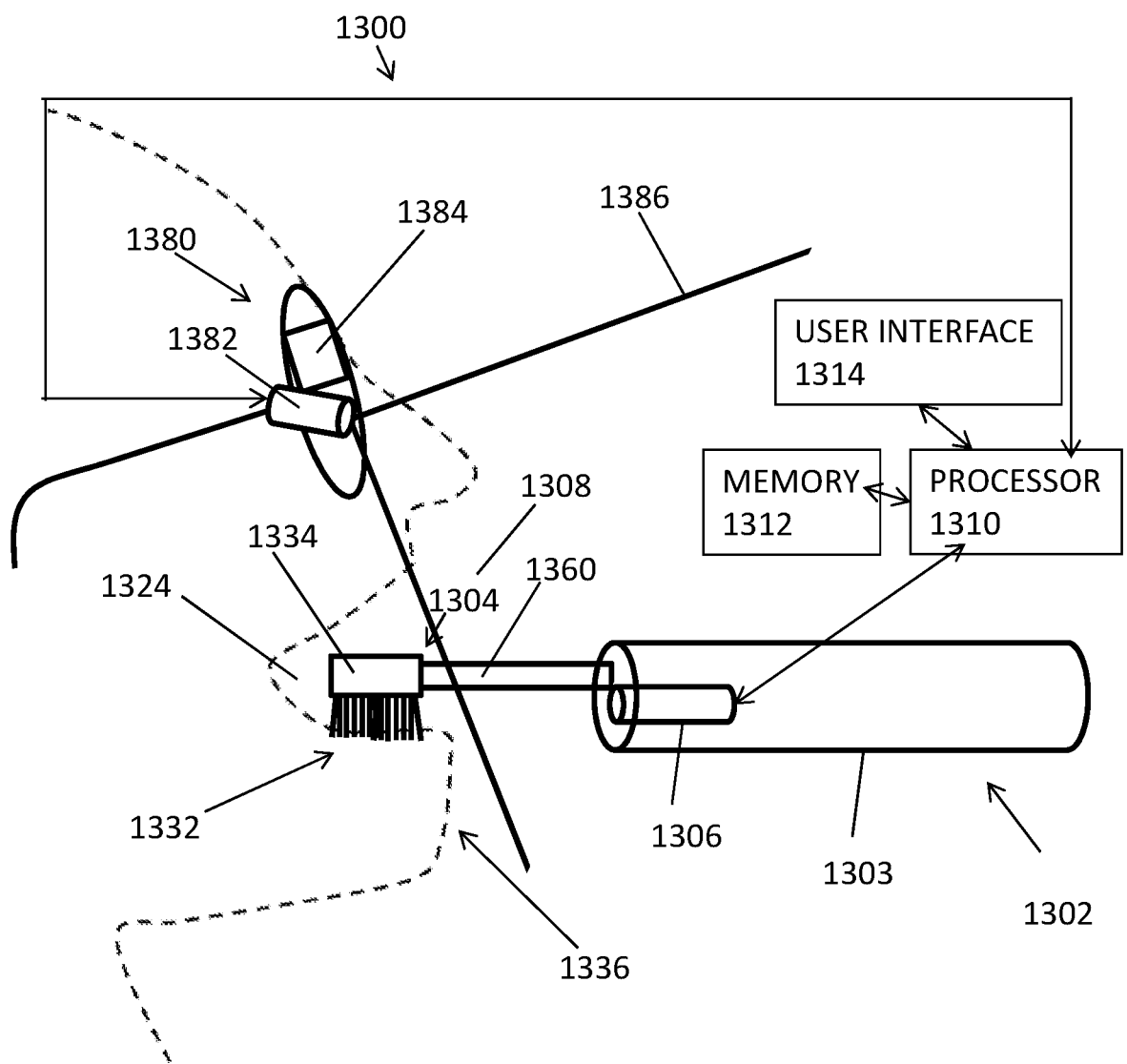
FIG. 13 is a simplified schematics of a toothbrush tracking system including user glasses, according to some embodiments of the invention.

FIG. 13 is a simplified schematic of a toothbrush tracking system 1300 including user glasses 1380, according to some embodiments of the invention.

In some embodiments, glasses 1380 include one or more imager 1382. In some embodiments, a FOV 1386 of imager 1382 configured to include at least a portion of a toothbrush 1302, when the toothbrush is being used by a user 1336. Alternatively or additionally, FOV 1386 is configured to include a reflection of user 1336 and/or toothbrush 1302, when user is tooth-brushing in front of a mirror. In some embodiments, one or more imager is configured to directly collect image/s of a user's face.

In some embodiments, glasses 1380 include more than one imager, for example a first imager configured to capture images of the toothbrush directly and a second imager configured to capture images including a reflection of the user and/or of the toothbrush.

In some embodiments, glasses 1380 include one or more marker, where, in some embodiments, markers on acquired images are used as landmarks (where use of landmarks includes one or more feature as described regarding and/or illustrated in FIG. 2 and/or elsewhere in this document).

In some embodiments, glasses 1380 include one or more user interface. For example, a display 1384 configured to display images to the user e.g. mounted to the glasses and/or projecting images onto glasses lens/es.

In some embodiments, glasses 1380 include one or more processor (e.g. including one or more feature as described and/or illustrated regarding processor 110 FIGS. 1A-1B) and/or connectivity to an external processor. In some embodiments, imager/s 1382 are connected to the processor e.g. sending data to the processor and/or receiving control instructions from the processor.

In some embodiments, glasses 1380 include a virtual reality headset and/or a mixed reality headset and/or an augmented reality headset. Where, for example, the user views image/s of an augmented view (e.g. including guidance and/or feedback e.g. regarding brushing e.g. as described elsewhere in this document) of images of the user brushing.

In some embodiments, feedback to a user (e.g. displayed on a headset and/or another user interface e.g. display 414 FIG. 4) includes feature/s and/or regions where one or more portion of the region is not visible to the user. In some embodiments, model/s and/or image/s of inside the oral cavity e.g. including dental feature/s and/or the dental implement are displayed. In some embodiments, feedback indication/s (e.g. including one or more feature as described regarding step 912, FIG. 9) are displayed on and/or with the model/s and/or image/s.

In some embodiments, glasses 1380 include a commercially available product, for example, Microsoft® HoloLens™, Magic Leap One™, Meta 2™.

In some embodiments, a dental device tracking system includes a Virtual Reality (VR) or Augmented Reality (AR) glasses 1380 and a toothbrush (lacking electronics) or an electric toothbrush. Where, in some embodiments, the toothbrush includes marker/s. In some embodiments, the glasses collect image/s of the toothbrush (e.g. of toothbrush marker/s) and/or of user body portion/s for tracking the toothbrush e.g. using methods as described elsewhere in this document.

In some embodiments, the brushing information and/or feedback displayed to the user is presented as a game. Where, in some embodiments, score on the game is related to brushing performance.

General

It is expected that during the life of a patent maturing from this application many relevant dental treatment and measurement technologies will be developed and the scope of the terms dental device is intended to include all such new technologies a priori.

As used herein the term "about" refers to ±20% The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A hand-held dental tracking device, the device comprising:
    a handle sized and shaped to be comfortably grasped by a human user's hand;
    a dental implement head attached to the handle;
    at least one imager with a field of view (FOV), where a direction and size of the FOV of the imager is such that when at least a portion of said dental implement head is within said user's mouth, said FOV includes at least a portion of said user's body outside the oral cavity, and
    a processor configured to:
        acquire from said at least one imager, at least a first image which includes said at least a portion of said user's body outside of said user's oral cavity;
        identify said at least a portion of said user's body portion in said first image with respect to said imager;
        determine, using at least said first image, a position of said dental device with respect to said at least a portion of said user's body portion; and
        determine a position of said portion of said dental device inside said user's oral cavity with respect to said user's body portion.

2. The device according to claim 1, further comprising receiving a correlation between said portion of said user's body portion and said user's oral cavity.

3. The device according to claim 2, wherein said receiving is from an external source.

4. The device according to claim 1, wherein said determining a position of said portion of said dental device inside said user's oral cavity is performed with respect to one or more teeth.

5. The device according to claim 1, further comprising receiving a correlation between said portion of said user's body portion and an upper jaw of said user.

6. The device according to claim 1, wherein said direction of said FOV is in a direction configured to include an image of a reflection, said reflection including said at least a portion said user's body outside the oral cavity and at least a portion of said dental device.

7. The device according to claim 1, wherein said at least one imager comprises:
    a first imager with a FOV configured to image at least a portion of said user's body outside the oral cavity; and
    a second imager with a FOV configured to image a reflection of at least a portion said user's body outside the oral cavity.

8. The device according to claim 7, wherein said second imager is located on a handle of said device.

9. The device according to claim 1, further comprising at least one contact sensor configured to detect contact between said dental implement head and a tooth.

10. The device according to claim 1, wherein said device comprises a detachable dental implement head, and wherein said detachable dental implement head comprises a toothbrush.

11. The device according to claim 1, wherein said device comprises a detachable dental implement head, and wherein said detachable dental implement head comprises a mirror.

12. The device according to claim 1, wherein said device comprises a detachable dental implement head, and wherein said detachable dental implement head comprises a calibration head.

13. The device according to claim 1, and further comprising said processor configured to display feedback to a dental practitioner, said feedback displayed on an anatomical model of said user.

14. The device according to claim 1, further comprising said processor configured to control one or more actuators based on said determined position of said at least a portion of said dental device within said user's oral cavity.

15. The device according to claim 1, further comprising said processor configured to:
determine a position of at least one lower face landmark; and
estimate, using said determined position, a mandibular angle.

16. A dental device tracking method comprising:
acquiring, using an imager of a dental device when at least a portion of said dental device is within said user's mouth, at least a first image which includes an image of at least one user body portion outside of a user's oral cavity;
identifying said at least one user body portion in said first image;
determining, using said at least said first image, a position of said dental device with respect to said at least one user body portion; and
determining a position of said portion of said dental device inside said user's oral cavity with respect to said user's body portion.

17. The method according to claim 16, further comprising correlating between said portion of said user's body portion and said user's oral cavity.

18. The method according to claim 17, further comprising receiving from an external source correlation data.

19. The method according to claim 16, further comprising correlating between said portion of said user's body portion and an upper jaw of said user.

20. The method according to claim 16, wherein said determining a position of said portion of said dental device inside said user's oral cavity is performed with respect to one or more teeth.

21. The method according to claim 16, wherein at least said first image also includes a reflected image.

22. The method according to claim 21, wherein said reflection includes at least a portion of said user's body outside the oral cavity.

23. The method according to claim 21, wherein said reflection includes at least a portion of said dental device.

24. The method according to claim 16, further comprising determining a position of at least one lower face landmark; and estimating, using said determined position, a mandibular angle.

25. The method according to claim 16, wherein said determining also includes determining a position of a/said portion of said dental device inside said user's oral cavity with respect to a dental feature using an anatomical model.

* * * * *